US012809380B2

(12) United States Patent
Kipnis

(10) Patent No.: US 12,809,380 B2
(45) **Date of Patent: *Nov. 24, 2026**

(54) LOOSELY COUPLED DISTRIBUTED CONTROL OVER DRONE AND PAYLOADS CARRIED BY THE DRONE

(71) Applicant: Air Constractive Ltd., Ganot Hadar (IL)

(72) Inventor: Moshe Kipnis, Bitzaron (IL)

(73) Assignee: Air Constractive Ltd., Ganot Hadar (IL)

( * ) Notice: Subject to any disclaimer, the term of this patent is extended or adjusted under 35 U.S.C. 154(b) by 444 days.

This patent is subject to a terminal disclaimer.

(21) Appl. No.: 18/025,404

(22) PCT Filed: Sep. 9, 2021

(86) PCT No.: PCT/IL2021/051097

§ 371 (c)(1),
(2) Date: Mar. 9, 2023

(87) PCT Pub. No.: WO2022/054056

PCT Pub. Date: Mar. 17, 2022

(65) Prior Publication Data

US 2023/0333556 A1 Oct. 19, 2023

Related U.S. Application Data

(60) Provisional application No. 63/077,493, filed on Sep. 11, 2020.

(51) Int. Cl.
*G05D 1/00* (2024.01)
*B64D 47/00* (2006.01)
(Continued)

(52) U.S. Cl.
CPC ............ *G05D 1/101* (2013.01); *B64D 47/00* (2013.01); *B64U 10/13* (2023.01); *B64U 10/14* (2023.01);
(Continued)

(58) Field of Classification Search
CPC .... G05D 1/101; G05D 1/0094; G05D 1/0816; G05D 1/106; G05D 1/0858; B64D 47/00;
(Continued)

(56) References Cited

U.S. PATENT DOCUMENTS

2013/0206915 A1* 8/2013 Desaulniers ........... B64U 10/20 244/165
2015/0053177 A1 2/2015 Wooldridge
(Continued)

FOREIGN PATENT DOCUMENTS

CN 108568868 9/2018
CN 115428289 12/2022
(Continued)

OTHER PUBLICATIONS

International Preliminary Report on Patentability Mar. 23, 2023 From the International Bureau of WIPO Re. Application No. PCT IL2021/051097. (6 Pages).
(Continued)

*Primary Examiner* — Rachid Bendidi
*Assistant Examiner* — Neit J. Nieves Flores

(57) ABSTRACT

A system and method for distributing control over a drone and an active-payload carried by the drone to loosely coupled drone controller and payload controller, are disclosed. The active-payload includes a self-embedded payload controller and at least one controllable thrust source or moving weight. The drone controller identifies a current active-payload type that is coupled to the drone for performing one or more tasks and selects a control-type, which
(Continued)

defines degrees of freedom (DOFs) to be controlled by the drone controller and released DOFs to be controlled by the payload controller, accordingly. The drone and active-payload perform the one or more task, wherein the drone controller controls maneuver instructions in drone controller controlled DOFs and simultaneously and asynchronously the payload controller controls maneuver instructions in the released DOFs by exerting controllable force or torque in the released DOFs by the at least one thrust source and/or moving weight.

20 Claims, 19 Drawing Sheets

(51) Int. Cl.

| | |
|---|---|
| ***B64U 10/13*** | (2023.01) |
| ***B64U 10/14*** | (2023.01) |
| ***B64U 50/34*** | (2023.01) |
| ***B64U 101/60*** | (2023.01) |

(52) U.S. Cl.

CPC .......... *B64U 50/34* (2023.01); *G05D 1/0094* (2013.01); *G05D 1/0816* (2013.01); *G05D 1/106* (2019.05); *B64U 2101/60* (2023.01); *B64U 2201/10* (2023.01); *B64U 2201/20* (2023.01)

(58) Field of Classification Search

CPC ........ B64U 10/13; B64U 10/14; B64U 50/34; B64U 2101/60; B64U 2201/10; B64U 2201/20; B64U 2201/104; B64C 2211/00

See application file for complete search history.

(56) References Cited

U.S. PATENT DOCUMENTS

| | | | | |
|---|---|---|---|---|
| 2019/0193853 | A1 | 6/2019 | Cantrell | |
| 2020/0231415 | A1* | 7/2020 | Sikora | A61G 5/1051 |
| 2021/0229808 | A1 | 7/2021 | Sikora et al. | |
| 2022/0413515 | A1 | 12/2022 | Kipnis | |

FOREIGN PATENT DOCUMENTS

| | | |
|---|---|---|
| EP | 2003057 | 10/2012 |
| WO | WO 2009/094603 | 7/2009 |
| WO | WO 2017/041304 | 3/2017 |
| WO | WO 2022/054056 | 3/2022 |

OTHER PUBLICATIONS

International Search Report and the Written Opinion Dated Jan. 13, 2022 From the International Searching Authority Re. Application No. PCT/IL2021/051097. (11 Pages).

Notice of Allowance Dated Apr. 12, 2023 from the US Patent and Trademark Office Re. U.S. Appl. No. 17/897,168. (8 pages).

Official Action Dated Feb. 17, 2023 From the US Patent and Trademark Office Re. U.S. Appl. No. 17/897,168. (10 Pages).

Tavora "Feasability Study of an Aerial Manipulator Interacting with a Vertical Wall",Naval Postgraduate School, Montery, Dissertation:137P., Jun. 2017.

Supplementary European Search Report and the European Search Opinion Dated May 24, 2024 From the European Patent Office Re. Application No. 21866217.9. (10 Pages).

Gonzalez-Desantos et al. "Active UAV Payload Based on Horizontal Propellers for Contact Inspections Tasks", Measurement, 165: 108106, XP086260309, Dec. 1, 2020.

* cited by examiner

Step response resistance force function

Graduate resistance force function

Table 1

| | X (Forwards) | Y (Right) | Height (Up) | Notes |
|---|---|---|---|---|
| 1 | Can be implemented with or without shaft-encoders on payload pivots. | | | Can be implemented with or without shaft-encoders on payload pivots. No need for calibrating flight patterns. Implementation without shaft encoders may require limiters with relative narrow free sector on the pivots |
| 2 | A calibrated wedge in the "quick release" connection to the drone. | | Inertial earth level | Recalibrating can be accomplished with few seconds of hovering |
| 3 | Payload coordinates are calibrated IAW drone coordinates with predefine short flight pattern | | | |
| 4 | Geodetic | Geodetic east | north Inertial earth level | For separate INS installation in drone and in payload. Recalibrating can be accomplished with predefined short flight pattern or by GPS northing |

FIG. 9

Table 2

| | Pitch | Roll | Yaw | Notes |
|---|---|---|---|---|
| 1 | Shaft-encoder relative to wedge and payload connection base. | | | This configuration enables a tight control of payload manipulators in traditional control methods. |
| 2 | Inertial - Earth level (IMU or Tilt sensor) | | Gyro measuring relative to zero setup | This configuration enables a very loosely coupled control. Recalibrating can be accomplished with short hovering or other predefined flight pattern |
| 3 | Full IMU or INS | | | This configuration enables a very loosely coupled control. Recalibrating can be accomplished with short hovering or other predefined flight pattern |

FIG. 10

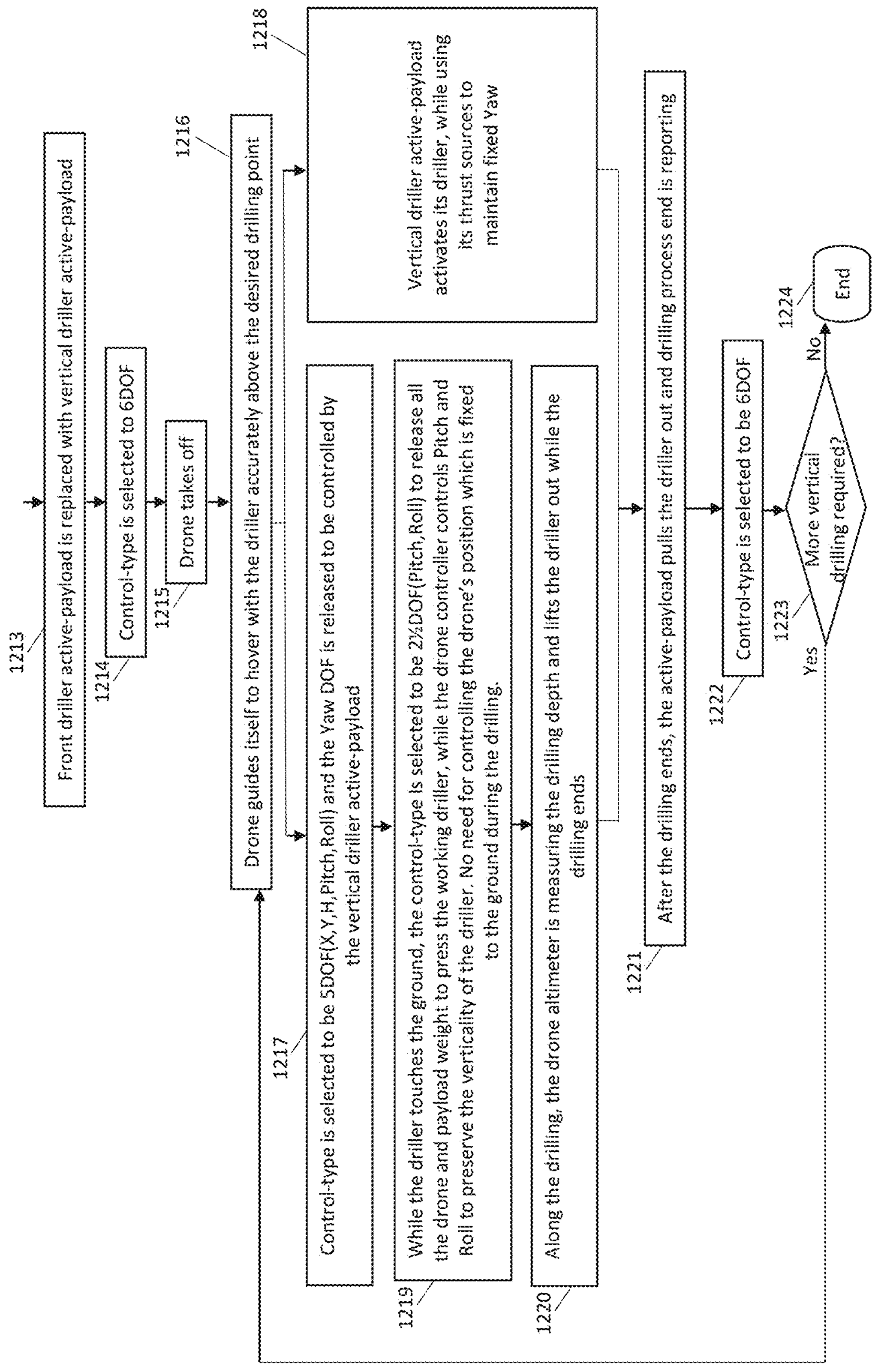
FIG. 12 - continuation

Table 3

| | Drone CS control type | Description, parameters, optional functions, Optional Use-case |
|---|---|---|
| 1 | 5DOF(Y,H,Pitch,Roll,Yaw) | The payload can move the drone only forwards and backwards (the released DOF – X). Optional use-cases:<br>- a simple walls driller (See FIG. 3A -3B).<br>- payload with contact detector.<br>- Payload with limited pivots attached to its connecting base for Pitch or Roll or Yaw balancing of second plate, and with front arm for multi tools operating, and with rear rod with balancing weight and rear set of thrusters attached to the second plate. All the described here enables to stabilize, balance, aim and operate the multi tools front arm independently from the drone's movements that are necessary for its stationarity and stability (See FIG. 16). |
| 2 | 5½DOF(Y,H,Pitch,Roll,Yaw) | Same as 5DOF(Y,H,Pitch,Roll,Yaw) with boundary protection function. Optional functions:<br>• $F_{resist} = \mp F_{max} \cdot [step\,(x - x_{max}) + step\,(x - x_{min})]$<br>• $F_{resist} = \{\mp Fmax \frac{F_{max}}{\lvert x - xmin_{or\ max}\rvert}\ for\ \lvert x - xmin_{or\ max}\rvert < x_0\ and\ xmin < x < xmax;\ Fresist = \pm Fmax\ for\ x < xmin\ or\ xmax < x;\ else\ Fresist = 0\}$ |
| 3 | 5DOF(X,H,Pitch,Roll,Yaw)<br>5½DOF(X,H,Pitch,Roll,Yaw) | Similar to 5DOF(Y,H,Pitch,Roll,Yaw) and 5½DOF(Y,H,Pitch,Roll,Yaw) with $y$ replacing $x$.<br>Optional Use-Cases: Horizontal Sowing, Drawing lines on walls. |
| 4 | 5DOF(X,Y,H,Pitch,Roll) | Here, the drone controller releases only the control over the drone's rotation (Yaw). Optional Use-Case: it can be used, for instance, for vertical drilling that requires a bigger torque on Yaw DOF than the torque that a regular heavy drone can provide.<br>FIG. 17 schematically illustrates this example. |
| 5 | 4DOF(H,Pitch,Roll,Yaw)<br>4½DOF(H,Pitch,Roll,Yaw) | Similar to 5DOF(Y,H,Pitch,Roll,Yaw) and 5½DOF(Y,H,Pitch,Roll,Yaw) with resisting/amplifying functions for $x$ and $y$ DOFs. Here, the payload thrusters can control the position of the drone on the horizontal plane, for better accurate and flexible tasks performing (See FIGs. 6A-6B and FIGs. 7A-7B). |
| 6 | 3½DOF(H,Pitch,Roll) | See FIG. 15. |

FIG. 18

LOOSELY COUPLED DISTRIBUTED CONTROL OVER DRONE AND PAYLOADS CARRIED BY THE DRONE

RELATED APPLICATION

This application claims the benefit of priority of U.S. Provisional Patent Application No. 63/077,493 filed on 11 Sep. 2020, the contents of which are incorporated herein by reference in their entirety.

TECHNICAL FIELD

The present disclosure, in some embodiments thereof relates to controller of drones. More specifically, to loosely coupled distributed control over drone and payloads carried by the drone.

BACKGROUND

In the last decades, multi rotor unmanned aeronautic vehicles, UAVs, (Here in after, "Drones") became more and more common. From a device used mainly for military purposes, drones have become in use of a variety of fields, such as photography, agriculture and the like. Drones are characterized by their hovering capability and their ability to control each degree of freedom (DOF) almost independently. In drones, there are coupling between Pitch and forward flying (X DOF), and between the Roll and the tangent flying, however, drones are able to exert direct forces to the six DOF (X, Y, Height, Pitch, Roll, Yaw), which is more than most other types of flying machines. These characteristics and the low price of drones make them very popular in many industrial fields.

SUMMARY

It is an object of the present disclosure to describe a system and a method for providing a loosely coupled distributed control over drone and payloads carried by the drone, which enables standard drones to carry many different types of payloads, to perform different tasks, and to replace payloads in the field, in order to quickly switch from one task to another.

It is a further object of the present disclosure to enable a payload designer to add special thrusters on the payload to improve its capability to exert forces on tools installed in the payload, that are stronger than the forces that the drone itself can produce in the required directions, without losing the drone flight controllability.

It is yet another object of the present disclosure to allow drone manufacturers to expertise in drones design and to allow payload manufacturers to expertise in the technologies and challenges of the payloads specific industrial field, and to allow users to integrate a mixture of drones and payloads from different vendors, to build a cost-effective inventory of drones and payloads that is optimized to the specific task that the user is performing.

The foregoing and other objects are achieved by the features of the independent claims. Further implementation forms are apparent from the dependent claims, the description and the figures.

In one aspect, the present disclosure relates to a method for distributing a control over a drone carrying an active-payload, wherein the drone is an aircraft that is able to hover and the active-payload comprises a self-embedded payload controller and at least one thrust source and/or moving weight, to a drone controller and the payload controller, comprising:

identifying by the drone controller a current active-payload type of the active-payload, temporarily and detachably coupled to the drone;

selecting by the drone controller a control-type from a predefined list of control-types; wherein each of the control-types defines degrees of freedom (DOFs) to be controlled by the drone controller and released DOFs to be controlled by the payload controller, according to the identified current active-payload type and according to one or more tasks planned to be performed by the drone and the current active-payload;

performing the one or more tasks by the drone and the current active-payload temporarily and detachably coupled to the drone; wherein the drone controller controls maneuver instructions in drone controller controlled DOFs and simultaneously and asynchronously the payload controller controls maneuver instructions in the released DOFs by exerting controllable force or torque in the released DOFs by the at least one thrust source and/or moving weight.

In a second aspect, the present disclosure relates to a system, comprising:

a drone, which is an aircraft that is able to hover;

an active-payload carried by the drone, which comprises a self-embedded payload controller and at least one thrust source and/or moving weight;

a drone controller, which identifies a current active payload type temporarily and detachably coupled to the drone, and selects a control-type from a predefined list of control types; wherein each of the control-types defines degrees of freedom (DOFs) to be controlled by the drone controller and released DOFs to be controlled by the payload controller, according to the identified current active-payload type and according to one or more task characteristics planned to be performed by the drone and the current active-payload; and wherein when performing the one or more tasks with the drone and the current active-payload temporarily and detachably coupled to the drone, the drone controller controls maneuver instructions in drone controlled DOFs and simultaneously and asynchronously the payload controller controls maneuver instructions in the released DOFs by exerting controllable force or torque in the released DOFs with the at least one thrust source and/or moving weight.

In a further implementation of the first and second aspects, the method further comprising:

for each control-type, setting predefined or changeable values of physical parameters defining the control rules and thresholds of use for each drone controller controlled DOF and for each released DOF.

In a further implementation of the first aspect, the values of physical parameters defining the thresholds for each released DOF contains maximal and/or minimal values.

In a further implementation of the first and second aspects, the active-payload is temporarily and detachably coupled to one or more docking points selected from a final set of defined docking points.

In a further implementation of the first and second aspects, the method further comprising:

aligning coordinates of the drone and the current active-payload by performing a calibration flight with a predefined route selected from a list of routes or by a stationary hovering, using inertial or rate sensors or direction-finding sensors that are installed on the drone and on the payload.

In a further implementation of the first and second aspects, the maneuver instructions are selected from a list of maneuver instructions.

In a further implementation of the first aspect, the control=type is defined manually, by a remote controlling the drone.

In a further implementation of the first aspect, the method further comprising defining a communication protocol between the drone controller and the payload controller;

wherein messages from the drone controller to the payload controller comprises at least one member of the following list:

the predefined list of control-types;

forces, imbalances and loads for each one or more docking point that the current active-payload is not allowed to violate;

a predefined list of control-types available for the drone and the current active-payload temporarily and detachably coupled to the drone;

values of physical parameters defining control rules and thresholds of use for each control-type;

values of physical parameters defining control rules and thresholds of use for each DOF and released DOF;

a list of calibration routes;

a stop or slow-down commands, attached to a relevant released DOF controlled by the payload controller;

boundaries and limits for the defined released DOFs controlled by the payload controller; and an in and/or out of boundaries flag massage; and wherein massages from the payload controller to the drone controller comprises at least one member of the following list:

the current active-payload weight, center of gravity relative to one or more docking points of the current active-payload and DOFs available to be controlled by the payload controller; parameters stating releasable DOFs with a maximal thrust and/or imbalance that is allowed to be exerted in each of the released DOFs controlled by the active-payload;

a position or orientation changing request message;

parameters setting of drone control rules and thresholds massage; and a request for changing control-type message.

In a further implementation of the first and second aspects, when an out of boundaries flag massage is sent from the drone controller to the payload controller, the drone controller takes control over the released DOFs, so that the drone controller controls all six DOFs of the drone until the drone and the current active-payload are in an in-boundary area.

In a further implementation of the first and second aspects, the control-type is defined automatically by a data communication interface between the drone controller and the payload controller.

In a further implementation of the first and second aspects, the method further comprising:

changing between different control-types from the predefined list of control-types for performing different one or more tasks, by the drone and the current active-payload.

In a further implementation of the first and second aspects, the method further comprising:

recognizing maneuvers performed by the current active-payload temporarily and detachably coupled to the drone by inertial and rate sensors installed in the drone, and performing maneuvers in response by the drone; and/or recognizing by the current active-payload temporarily and detachably coupled to the drone, maneuvers made by the drone, by one or more inertial and rate sensors installed in the current active-payload temporarily and detachably coupled to the drone, and performing maneuvers by the current active-payload in response.

In a further implementation of the first and second aspects, the selected control-type defines that the payload controller controls the released DOFs independently from the drone controller.

In a further implementation of the first and second aspects, the selected control-type defines that the released DOFs are controlled by the payload controller and are supervised by the drone controller.

In a further implementation of the first and second aspects, the drone controller takes control over the released DOFs to control maneuver instructions in the released DOFs.

In a further implementation of the first and second aspects, there is a communication protocol between the drone controller and the payload controller, and the drone controller sends a stop message to the payload controller to stop controlling the released DOFs by the payload controller and to control the released DOFs by the drone controller.

In a further implementation of the first and second aspects, there is a communication protocol between the drone controller and the payload controller, and the drone controller sends to the payload controller a slow-down message attached to a relevant released DOF controlled by the payload controller.

In a further implementation of the first and second aspects, the drone is operated by an operator, that uses a control station or a remote or by a remote autonomous Control and Command Operation System; and the current active-payload is operated by a second operator the uses a second control station or a remote.

In a further implementation of the second aspect, the drone is operated by an operator, that uses a control station or a remote or by a remote autonomous Control and Command Operation System; and the current active-payload is operated by a second operator the uses a second control station or a remote.

In a further implementation of the second aspect, the system further comprising a drone power source and a current active-payload power source, which are independent or which are electrically connected according to one of the following arrangements:

the current active-payload uses the drone power source to operate tools installed in the current active payload;

the current active-payload power source supplies power to the drone; and the current active-payload power source and the drone power source are electrically connected to an external ground power source.

In a further implementation of the second aspect, the drone and the current active-payload are connected by one to three gimbal pivots or by Kardani joint; wherein the pivots contain limiters which enable the payload controller to rotate the current active-payload alone inside limits created by the limiters, while the drone controller is able to change the drone orientation as required for keeping the drone position stable.

In a third aspect, the present disclosure relates to a drone, which is an aircraft that is able to hover, comprising:

a drone controller which identifies a current active-payload type of an active-payload temporarily and detachably coupled to the drone, and selects a control-type from a predefined list of control-types; wherein each of the control-types defines degrees of freedom (DOFs) to be controlled by the drone controller and released DOFs to be controlled by a payload controller, which is embedded in the active-payload, according to the identified current active-payload type and according to one or more task characteristics planned to be performed by the drone and the current active-payload; and wherein when the drone performs one or more tasks with the current active-payload temporarily and detachably coupled to the drone, the drone controller controls maneuver instructions maneuvering the drone and simultaneously and asynchronously the payload controller controls maneuver instructions maneuvering the drone and the current active-payload.

In a further implementation of the third aspect, the drone controller defines values of physical parameters defining control rules and thresholds of use for each released DOF and for every control-type.

In a fourth aspect, the present disclosure relates to an active-payload, temporarily and detachably coupled to a drone, comprising:

one or more thrust sources and/or moving weight; and a payload controller, which receives released degrees of freedom (DOFs) from a drone controller to be controlled by the payload controller, and instructs the active-payload to perform maneuvers along the released DOFs;

wherein when the drone performs one or more tasks with the active-payload temporarily and detachably coupled to the drone, the drone controller controls maneuver instructions maneuvering the drone, and simultaneously and asynchronously the payload controller controls maneuver instructions maneuvering the drone and the payload by exerting controllable force or torque in the released DOFs with the one or more thrust sources and/or moving weight.

In a further implementation of the fourth aspect, the active-payload further comprising one or more inertial and rate sensors installed in the active-payload, wherein the payload controller recognizes maneuvers performed by the drone by the one or more inertial and rate sensors and instructs the payload to perform maneuvers in response.

In a fifth aspect, the present disclosure relates to a process of using a controller for controlling a drone, provided a system, comprising:

a drone, which is an aircraft that is able to hover;

an active-payload carried by the drone, which comprises a self-embedded payload controller and at least one thrust source and/or moving weight;

a drone controller, which identifies a current active payload type temporarily and detachably coupled to the drone, and selects a control-type from a predefined list of control types; wherein each of the control-types defines degrees of freedom (DOFs) to be controlled by the drone controller and released DOFs to be controlled by the payload controller, according to the identified current active-payload type and according to one or more task characteristics planned to be performed by the drone and the current active-payload; and wherein when performing the one or more tasks with the drone and the current active-payload temporarily and detachably coupled to the drone, the drone controller controls maneuver instructions in drone controlled DOFs and simultaneously and asynchronously the payload controller controls maneuver instructions in the released DOFs by exerting controllable force or torque in the released DOFs with the at least one thrust source and/or moving weight.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 9 schematically shows Table 1, which lists optional methods to achieve coordinates matching for X axis (Forwards), Y axis (Right) and H axis (Up) are briefly presented, according to some embodiments of the present disclosure;

FIG. 10 schematically Table 2, which lists optional methods for orientation coordinates matching between the drone and the active-payload, according to some embodiments of the present disclosure;

FIG. 18 schematically shows Table 3, which lists a partial set of possible examples of control types of the drone controller with some of their optional limits and force functions and with possible optional use-cases for each, according to some embodiments of the present disclosure.

DETAILED DESCRIPTION

Figure 1:
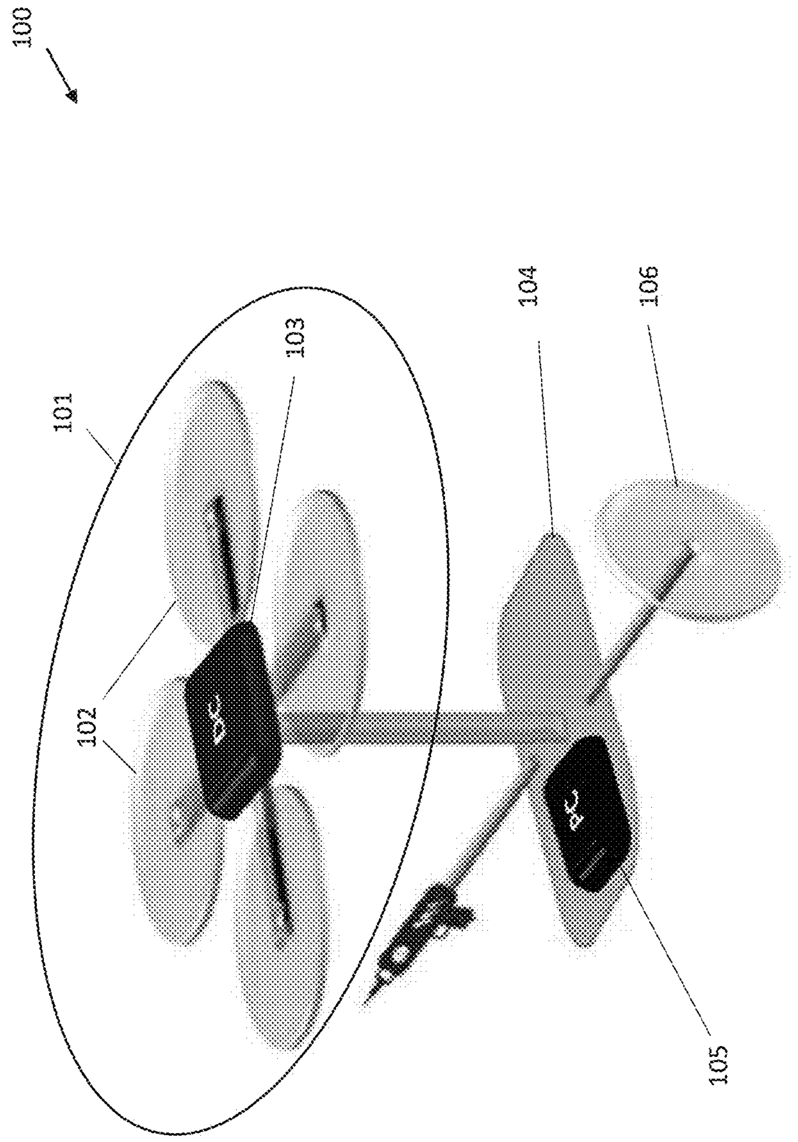
FIG. 1 schematically shows a system of a drone and a payload carried by the drone with a loosely distributed control over the drone and the payload, according to some embodiments of the present disclosure.

The present disclosure, in some embodiments thereof, relates to controller of drones. More specifically, to loosely coupled distributed control over drone and payloads carried by the drone.

The term drone herein after refers to any aircraft that is able to hover, for example, a multi rotor unmanned aeronautic vehicle (UAV).

In recent years, the use of drones has become very popular in a variety of fields. Nevertheless, when it comes to heavy industrial tasks such as drilling, cables pulling, screws tightening, hammering, sawing, welding and the like drones can hardly be seen in use. There are special drones that are built together with a dedicated payload specially to perform those tasks; however, these drones are very complex and expensive and usually having winches and/or manipulators adapted to perform a specific task and therefore lack modular ability to perform varying tasks. In this case, an army of unique and expensive drones is needed to perform a multi-tasked work. Another problem in drones designed with their payload is the fact that the drone operator cannot change anything in the setting of the drone and/or payload although the drone operator is the end user and the expert of performing the specific task for which the drone and payload have been designed.

Another complex challenge to perform an industrial task with drones is the forces applied on the drone when performing the industrial task while hoovering. Unlike ground vehicles such as cranes and drillers, which are anchored to the ground when performing industrial task, the drone performs the industrial tasks while hoovering. Therefore, it is much more difficult to control and operate an industrial heavy payload while the carrier needs to hover in the air with winds and other dynamic forces. Another problem that arises from the fact that the drone performs the industrial tasks while hoovering a responsibility problem. No drones manufacturer is willing to keep his responsibility over the drone flight, while it is operating a payload that was designed, independently, by a third party. Moreover, the drones manufacturers are not easily letting the payloads manufacturers to tune their drone flight control coefficients, and even when they do, the payload manufacturers usually do not possess enough expertise in aerodynamic control to conduct the tuning accurately enough.

In addition, since none of the two sides of the drone manufacturers and payloads manufacturers is willing to take the responsibility on his products without a mutual and full integration and tests, regulating authorities forbid the operation of any drone and payload couple to it without testing and certifying the exact drone and payload configuration, as they were one unified machine.

In order to find a solution for the above-mentioned problems, a decentralized structure of the drone and payload is necessary.

The present disclosure discloses a loosely coupled control systems having drone and payload controllers installed to operate a drone and a payload simultaneously in an independent and unsynchronized manner for performing industrial tasks. The drone controller divides the control over the drone movement in different DOFs between the payload controller and the drone controller. The drone controller allocates DOFs to the payload controller to exert forces and thrusts in the allocated DOFs by one or more thrust sources installed in the active-payload. The rest of the DOFs are controlled by the drone controller, which controls thrust sources installed in the drone. The two controllers are independent and each controller controls the movement of the drone in the DOFs under its control.

The distribution of the control over the drone movement between the drone and the payload controllers allows overcoming the problems mentioned above and enables to work only with one drone and a set of payloads, which are easily replaced every time a different type of task is needed. The distributed control over the drone and the payloads also enables a payload designer to add special thrusters on the payload to improve its capability to exert forces on the tools installed in the payload while performing an industrial task, that are stronger than the forces that the drone itself can produce in the required directions, without losing the payload flight controllability. The drone controller is not responsible to the exert forces in all six DOFs of the drone, but only in the DOFs that are defined to be controlled by the drone controller. The payload controller is responsible to exert forces in released DOFs which are the DOFs the drone controller is not controlling. Thereby, the payload controller controls the movement of the drone in the released DOFs and the movement of the payload in the released DOFs so that the forces on the payload tools are exerted in the released DOFs without considering the forces exerted in the other DOFs, which not controlled by the payload controller.

In addition the distributed control over the drone and the payloads allows drone manufacturers to expertise in drones design and to allow payload manufacturers to enhance the payload tools performance. Moreover, the distributed control over the drone and its payloads enables users to easily control the use of the drone and the payload and easily control the task performed by the drone, the payload and the payload tools, and to perform multiple task with one drone and a set of payloads which are easily replaced and attached to the drone.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer and/or computerized device, partly on the user's computer and/or computerized device, as a stand-alone software package, partly on the user's computer (and/or computerized device) and partly on a remote computer or entirely on the remote computer or server. In the latter scenario, the remote computer may be connected to the user's computer and/or computerized device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which schematically shows a system of a drone and a payload carried by the drone with a loosely distributed control over the drone and the payload, according to some embodiments of the present disclosure. System 100 comprises a drone 101, which carries an active-payload 104, which is a payload with a self-embedded payload controller 105 and at least one thrust source or moving weight such as thruster 106. The active-payload 104 includes a platform on which different tools are installed to perform different tasks. Active-payload 104 is loosely and detachably coupled to the drone 101 and may be easily replaced by other active-payloads with other tools. Drone 101 comprises four thrusters 102 (the term thrusters may also be referred to as propellers and the two terms may be interchangeably used herein after) and a drone controller 103. The drone controller 103 includes at least one processor that controls the movement of the drone in all six Degrees of Freedom (DOFs) of X-axis, Y-axis, Height, Pitch, Roll and Yaw of the flight of the drone, and it is communicating with inertial sensors, rate sensors, direction-finding sensors and other optional sensors, which are installed in the drone 101. For example, Pitot, sense and avoid sensors, cameras, Light Detection and Ranging sensors (LIDARS), altimeters, Radio Detection and Ranging sensors (RADARS) and the like. The drone controller 103 also may include an accurate relative navigation unit for example, Global Navigation Satellite System (GNSS) receivers, Inertial Navigation System (INS), Inertial Measurement Unit (IMU), tilt-sensor or three-dimensional (3D) magnetometer, Global Positioning System (GPS), northing system and the like. The drone controller 103 controls the movements of the drone 101 and provides maneuvering instructions to the drone 101. According to some embodiments of the present disclosure, the drone controller 103 identifies an active-payload type of the active-payload 104 that is temporarily and detachably coupled to the drone 101, for example by receiving manually input, separately through a ground control of the drone 101 and a ground control of the active-payload 104. Alternatively, when there is a communication protocol established between the drone controller and the payload controller the identification may be automatically by messages that are sent from the payload controller to the drone controller. Another option is by scanning a barcode that enables the drone controller to automatically detect the type of the active-payload. According to some embodiments of the present disclosure, the drone controller 103 selects a control-type from a predefined list of control-types. Each of the control-types defines degrees of freedom (DOFs) from the six DOFs, to be controlled by the drone controller 103. The rest DOFs, are released by the drone controller 103 to be controlled by the payload controller 105, according to the identified current active-payload type and according to one or more tasks planned to be performed by the drone 101 and the current active-payload 104. The at least one thrust source and/or moving weight, such as thruster 106 is able to exert a controllable lift forth that enables the payload controller 105 to take the control over the released DOFs that are released from the control of the drone controller 103, and to preserve the imbalance inside the boundaries of the active-payload 104 along the performance of the one or more tasks done by the tools installed in the active-payload 104. When the drone 101 and the current-active payload 104 perform the one or more tasks, the drone controller 103 controls maneuver instructions in drone controller controlled DOFs and simultaneously and asynchronously the payload controller 105 controls maneuver instructions in the released DOFs. The payload controller 105 includes at least one processor and controls the released DOFs by exerting controllable force or torque in the released DOFs with the at least one thrust source or moving weight, such as thruster 106 shown in FIG. 1. The active-payload may also include inertial sensors, rate sensors, direction-finding sensors and other optional sensors installed in it.

In some embodiments of the present discloser, a possible configuration of the thrust sources installed in the active-payload, includes a plurality of propellers and stators installed on the same pole (or one parallel poles) where some of the propellers rotate clockwise (CW) and other rotate counter clockwise (CCW) to enable rapid and bidirectional changes to the cumulative thrust without the need to stop or reverse the rotation of the propeller of thrust source that is compose of a single propeller. Moreover, optional combinations of thrust sources from this type, can produce a better controllability on the residual torque that the propellers or the stators are exerting on the pole.

Figure 2:
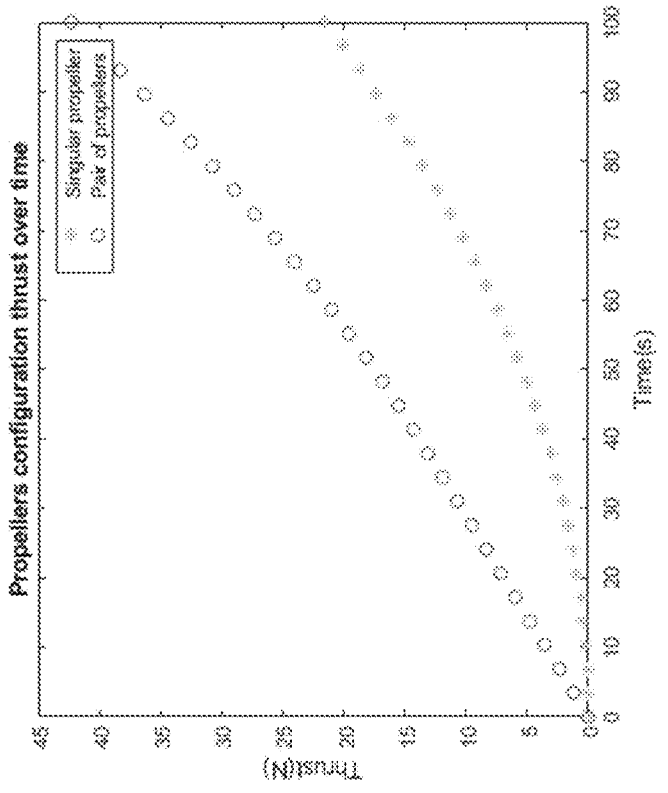
FIG. 2 schematically shows two qualitative graphs describing the thrust over time of singular propeller and a pair of propellers assuming linear and equal change of the propellers angular velocity over time, with the propellers of the pair of propellers configuration starting with some initial spinning rate ($\pm\omega 0$), according to some embodiments of the present disclosure.

An example of thrust source comprising two propellers arrangement may be as follows:

A thrust source which is built from two identical propellers installed on the same pole. One is rotating CW to exert force towards the positive direction of the pole and the second is installed in 180 degrees and rotating CCW to exert thrust towards the negative direction of the pole. When the two propellers rotate at some high equal spinning rates (±ω0), the cumulative thrust along the pole is zero. In this arrangement and propellers spinning rates of the thrust source, a small increasing of the spinning rate of the propeller that is rotating CW and/or decreasing of the spinning rate of the propeller that is rotating CCW will rapidly exert a strong force towards the positive direction of the pole. Equivalently, if a negative force is required, a decreasing of the CW propeller spinning rate and increasing of the CCW propeller spinning rate is performed. FIG. 2 schematically shows two qualitative graphs describing the thrust over time of singular propeller and a pair of propellers assuming linear and equal change of the propellers angular velocity over time, with the propellers of the pair of propellers configuration starting with some initial spinning rate (±ω0), according to some embodiments of the present disclosure. It can be seen from FIG. 2 that the thrust over time of the pair of propeller configuration provide stronger thrust and is therefore more efficient in cases a strong thrust is needed, according to some embodiments of the present disclosure.

According to some embodiments of the present disclosure, the payload controller 105 is loosely coupled to the drone controller 103, in the sense that it may work independently from the drone controller and control simultaneously and asynchronously the movement of the active-payload 104 and the movement of the drone in the released DOFs. Alternatively, the payload controller 105 may control the released DOFs under the supervision of the drone controller 103, which may take control over the released DOFs when necessary. For example, in case of boundaries crossing of the drone 101 to an out of boundary area.

According to some embodiments of the present disclosure, active-payload 104 is replaceable and temporarily and detachably coupled to drone 101 for performing one or more tasks with the drone 101 and with the active-payload 104. According to some embodiments of the present disclosure, after active-payload 104 is coupled to the drone 101, drone controller 103 identifies the active-payload type, for example, by receiving a massage from the payload controller in case there is a communication channel between the drone controller and the payload controller. Alternatively, the identification of the active-payload type by the drone controller may be done manually, by a drone operator, which feeds the active-payload type to the drone controller. According to the identified active-payload type the drone controller selects a control type with control parameters, which are suitable for the drone operation with the identified active-payload type. The control-type of the drone controller is the combinations of the drone controller capabilities to control certain DOFs and release the control over the other DOFS, with or without supervision or influence on the released DOFs. According to the control-type selected, the DOFs, which are controlled by the drone controller 103, are defined, and the released DOFs are defined to be controlled by the payload controller 105 of active-payload 104. According to some embodiments of the present disclosure, the payload controller 105 controls the released DOFs defined by drone 101 by using the at least one thrust source or moving weight such as thruster 106.

Figure 3:
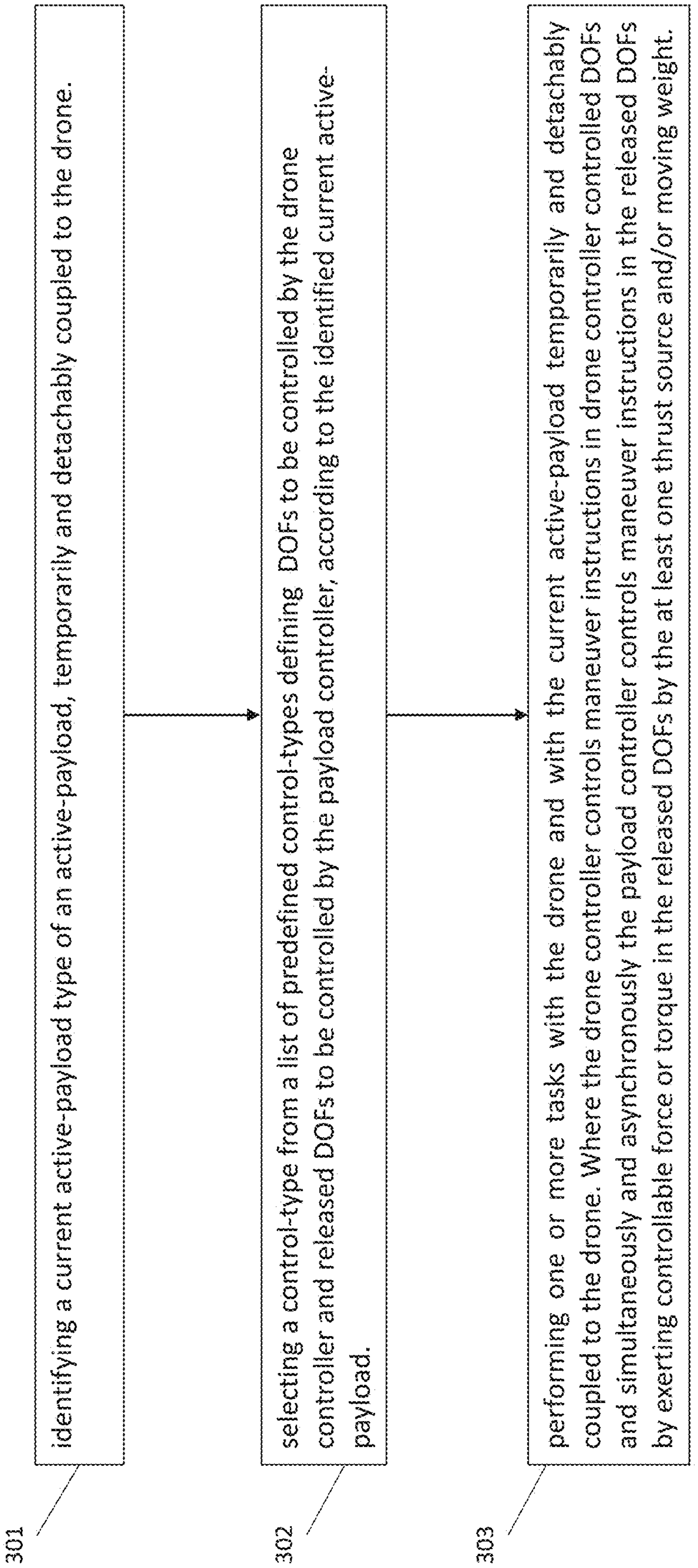
FIG. 3 schematically shows a flow chart describing a method for distributing a control over a drone carrying a payload to a drone controller and a payload controller, according to some embodiments of the present disclosure.

Reference is now made to FIG. 3, which schematically shows a flow chart describing a method for distributing a control over a drone carrying an active-payload to a drone controller and a payload controller, according to some embodiments of the present disclosure. At 301, an active-payload 104 is coupled to the drone 101 for performing one or more tasks with the drone 101 and the active-payload 104. The drone controller 103 identifies a current active-payload type of the active-payload 104, temporarily and detachably coupled to the drone 101 for example by receiving manual input from a drone operator. Alternatively, when there is a communication protocol established between the drone controller 103 and the payload controller 105 the identification may be automatically by messages that are sent from the payload controller 105 to the drone controller 103. At 302, a control-type is selected by the drone controller 103, according to the identified current active-payload 104. Each control-type defines DOFs from the six DOFs of the drone 101 to be controlled by the drone controller 103 and released DOFs, which are released from the control of the drone controller 103 to be controlled by the payload controller 105. The selection of the control-type may be implemented for example by a state machine. The payload controller 105 controls movement of the active-payload 104 and the movement of the drone 101 in the released DOFs by instructing the at least one thrust source or moving weight (such as thruster 106) installed in the active-payload to exert forces or torque in the released DOFs. At 303, one or more tasks are performed with the drone 101 and with the active-payload 104 temporarily and detachably coupled to the drone 101. According to some embodiments of the present disclosure, the drone controller 103 provides maneuver instructions maneuvering the drone 101 in the DOFs, which are controlled by the drone controller. Simultaneously and asynchronously the payload controller 105 provides maneuver instructions maneuvering the drone 101 and the active-payload in the released DOFs, using the at least one thrust source or moving weight of the active-payload 104. According to some embodiments of the present disclosure, the at least one thrust source or moving weight of the active-payload 104 enables the payload controller 105 to control the active-payload movements. The payload controller 105 is loosely coupled to the drone controller 103 and controls the active-payload 103 movements simultaneously and asynchronously to the drone controller 103 controlling the drone 101 movements. In some embodiments of the present disclosure, the payload controller 105 is independent of the drone controller 103, and the released DOFs are controlled only by the payload controller 105, without a supervision of the drone controller 103. For example, the drone 101 may be set to be in a static mode, which controls the DOFs controlled by the drone controller, and sets this DOFs constant, and the payload controller 105 provides maneuver instructions which operates the active-payload and the drone in the released DOFs simultaneously asynchronously and independently from the drone controller 103.

The control-type may be denoted as follows: (number of DOFs controlled by the drone controller)(elaboration of the DOFs).

For example, a control-type of four DOFs of Height, Pitch, Roll and Yaw, may be denotes as: 4DOF(H, Roll, Pitch, Yaw). In this case, the drone controller controls over the Height of the drone and the three orientation DOFs of the drone—Pitch, Roll and Yaw, leaving the horizontal position of the drone to be fully controlled by the payload controller. The payload controller controls the horizontal position (the X-axis and Y-axis DOFs) by operating side thrusters (or other thrusters) that are installed in the active-payload.

In some other embodiments of the present disclosure, the released DOFs are not fully controlled only by the payload controller 105, but rather they are also supervised by the drone controller 103. This means that the payload controller 105 may control the released DOFs, but the drone controller 103 supervises the movement of the drone in the released DOFs and in case it is necessary, the drone controller 103 takes control over the movement of the drone 101 and the active-payload 104 in the released DOFs. For example, the payload controller may control the released DOFs as long as the drone 101 does not cross certain boundaries. In this case, the drone controller 103 continues to monitor the released DOFs of the drone 101 and when the at least one active-payload thrust source is trying to push the drone out of a certain boundaries, the drone controller, prevents this boundaries crossing. According to some embodiments of the present disclosure, the drone 101 exerts a much bigger force than the force exerted by the thrust source installed in the active-payload 104, in an opposite or different direction from the direction the active-payload thrust source pushes to, in order to be able to prevent the active-payload thrust source form pushing the drone out of the certain boundaries. In a case of released DOFs that are not fully controlled only by the payload controller 105, and which are supervised by the drone controller 103, the control-type may be denoted for example as 4½DOF(H,Pitch,Roll,Yaw). Where 4 denotes that there are four DOFs controlled by the drone controller 103 and the ½ denotes that the other two released DOFs (the horizontal position X-axis and Y-axis) are not fully controlled only by the payload controller 105, and they are supervised by the drone controller 103 as well.

Figure 4B:
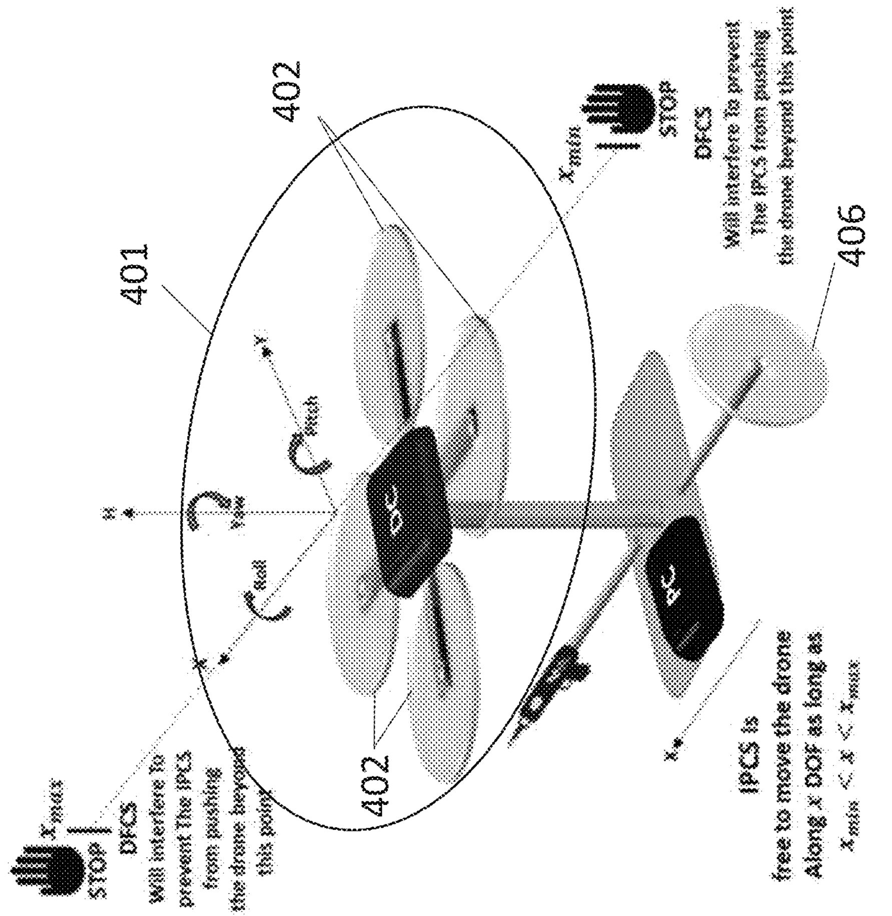
FIG. 4B schematically shows a drone and an active-payload carried by the drone, where the drone controller releases a DOF to be not fully controlled by the payload controller only, but with a safety supervision of the drone controller to prevent boundary crossing, according to some embodiments of the present disclosure.
Figure 4A:
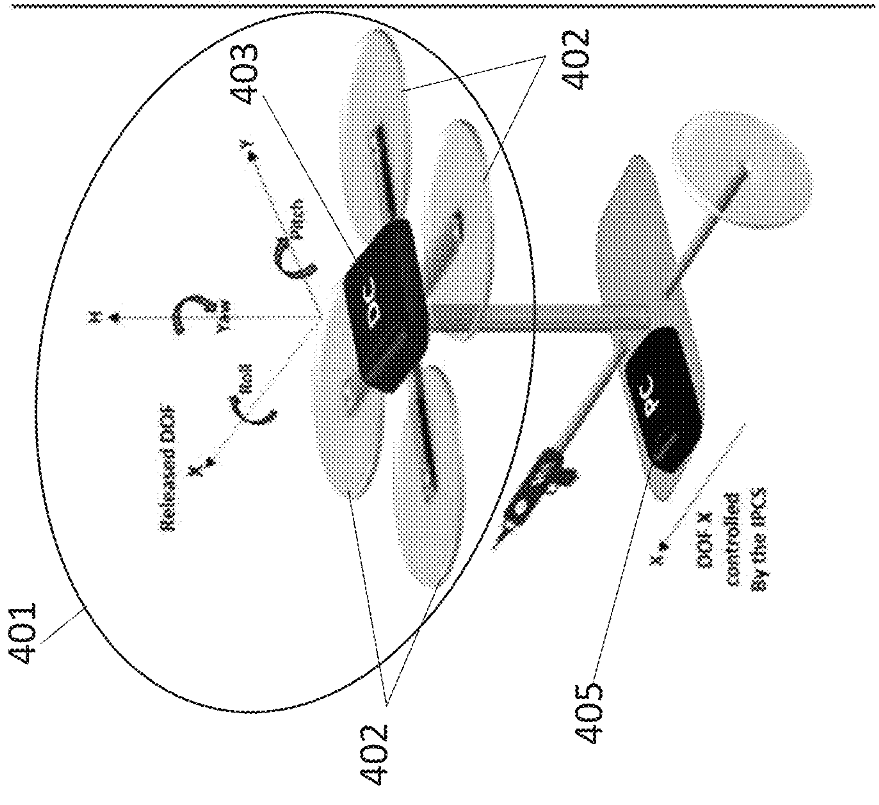
FIG. 4A schematically shows a drone and an active-payload carried by the drone, where the drone controller releases a DOF to be fully controlled by the payload controller only, according to some embodiments of the present disclosure.

FIG. 4A, schematically shows a drone 401 and an active-payload 404 carried by the drone 401, where the drone controller 403 releases a DOF to be fully controlled by the payload controller 405 only, according to some embodiments of the present disclosure. In FIG. 4A, a drone controller 403 of the drone 401 controls 5DOFs of Height, Y-axis, Roll, Pitch and Yaw. The control over the X-axis, is defined to be controlled by payload controller 405, so that the movements of active-payload 404 and of the drone 401 in the X-axis is fully controlled only by the payload controller. FIG. 4B, schematically shows a drone 401 and an active-payload 404 carried by the drone 401, where the drone controller 403 releases a DOF to be not fully controlled by the payload controller 405 only, but with a supervision of the drone controller 403 to prevent boundary crossing, according to some embodiments of the present disclosure. In FIG. 4B the drone controller 403 sets boundaries on X-axis DOF so that when the payload controller 405 tries to push drone 403 beyond the set boundaries of xmin<x<xmax, the drone controller 403 operates drone thrust source such as thrusters 402 to exert a force which prevents this cross of boundaries. For example by exerting a bigger force than the force exerted by the at least one active-payload thrust source such as thruster 406, pushing the drone 401 to another direction.

Figure 5:
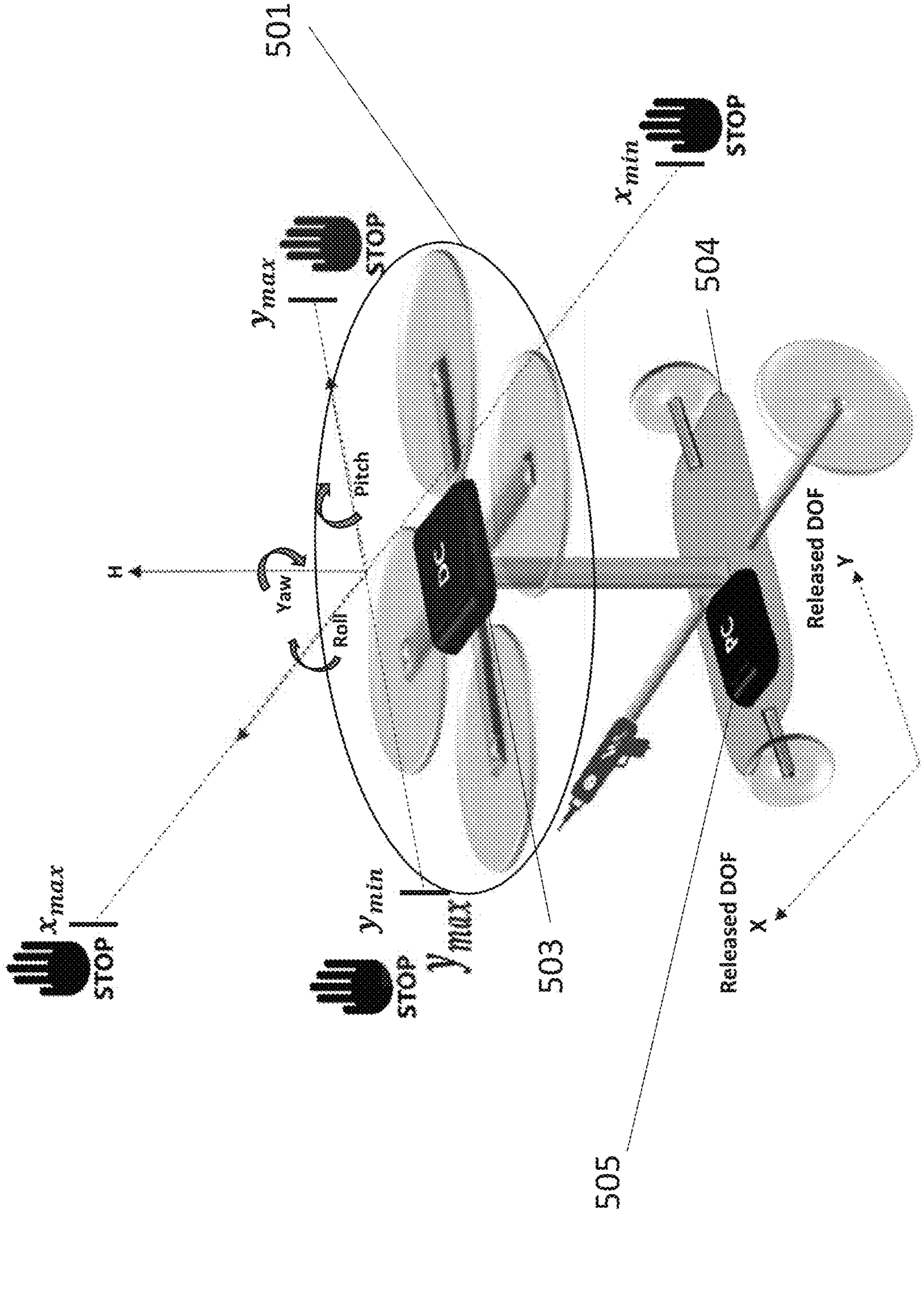
FIG. 5 schematically shows an example of a drone with a control-type of 4½DOF(H, Pitch, Roll, Yaw), according to some embodiments of the present disclosure.

FIG. 5 schematically shows an example of a drone 501 with a drone control-type of 4½DOF(H, Pitch, Roll, Yaw), according to some embodiments of the disclosure. In FIG. 5, payload controller 505 controls over the drone position on the horizontal plane of height H, as long as the boundaries of xmin, xmax and ymin, ymax are not crossed, i.e. as long as xmin<x<xmax and ymin<y<ymax.

In some embodiments of the present disclosure, the boundaries of the released DOFs controlled by the payload controller may be predefined fixed boundaries for example, in the case of horizontal position DOFs (X-axis and Y-axis) the boundary may be a geo-fence or an operator predefined polygon. In some other embodiments of the present disclosure, the released DOFs boundaries may not be predefined and may be changed in real-time instantaneously, so that the drone controller 503 sets the boundaries in real time in accordance with a current status that emerges from data obtained from optional sensors that are installed in the drone 501. The optional sensors may be, for example, sense and avoid sensors, cameras, LIDARS, altimeters, radars and the like. Therefore, according to some embodiments of the present disclosure, the drone controller 503 recognizes real time boundaries that were not predefined and prevents the drone 501 and the active-payload 504 carried by the drone 501 from crossing these boundaries.

Figure 6A:
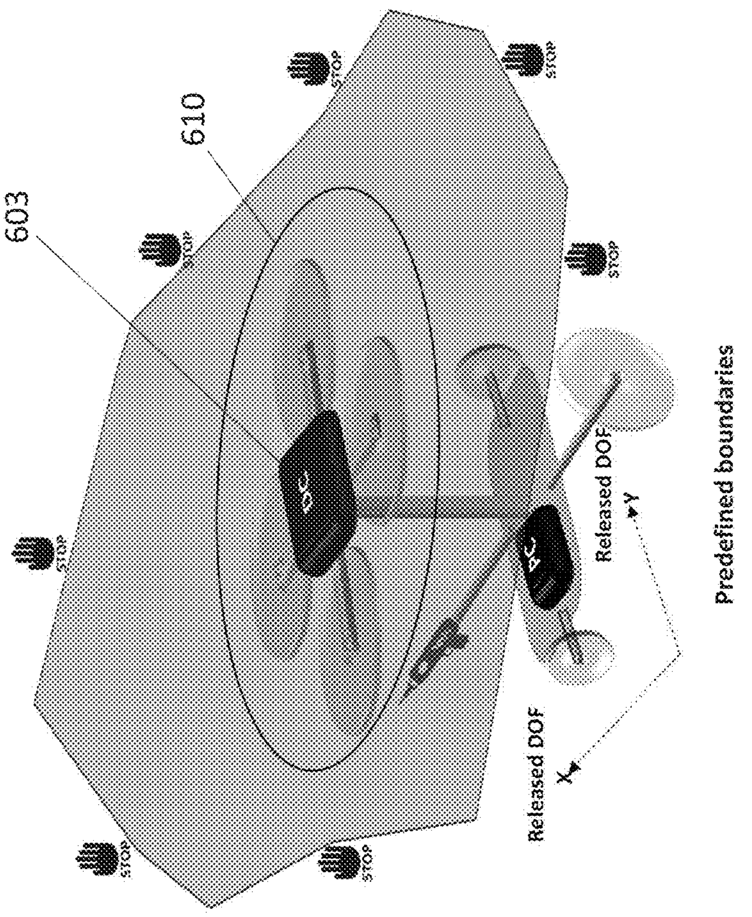
FIG. 6A schematically shows an example of a drone with the control-type of 4½DOF(H,Pitch,Roll,Yaw), with predefined boundaries, according to some embodiments of the present disclosure.
Figure 6B:
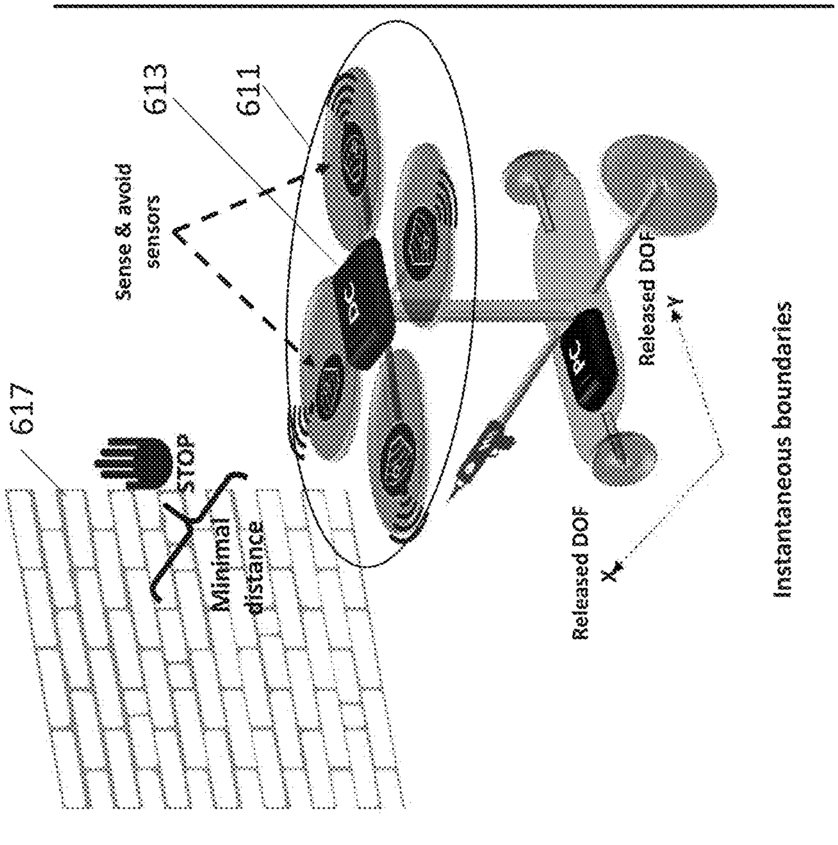
FIG. 6B schematically shows an example of drone with a control-type of 4½DOF(H,Pitch,Roll,Yaw), with a real-time changing boundaries, according to some embodiments of the present disclosure.

FIG. 6A schematically shows an example of a drone 601 with the control-type of 4½DOF(H,Pitch,Roll,Yaw), with predefined boundaries, according to some embodiments of the present disclosure. FIG. 6B schematically shows an example of drone 611 with a control-type of 4½DOF(H, Pitch,Roll,Yaw), with a real-time changing boundaries of a wall 617, which was not predefined, according to some embodiments of the present disclosure.

Figure 7B:
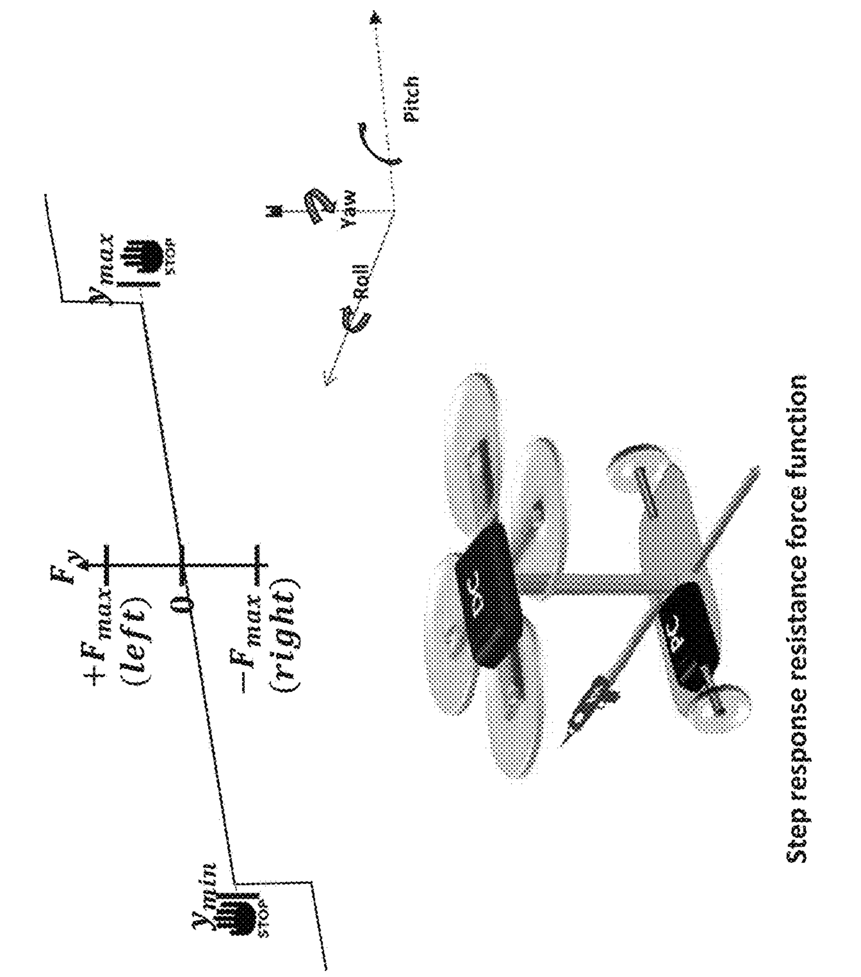
FIGS. 7A and 7B schematically show examples of the control-type of 5½DOF(X,H,Pitch,Roll,Yaw), which shows a sharp and graduate resisting force exerting to prevent boundaries crossing, according to some embodiments of the present disclosure.
Figure 7A:
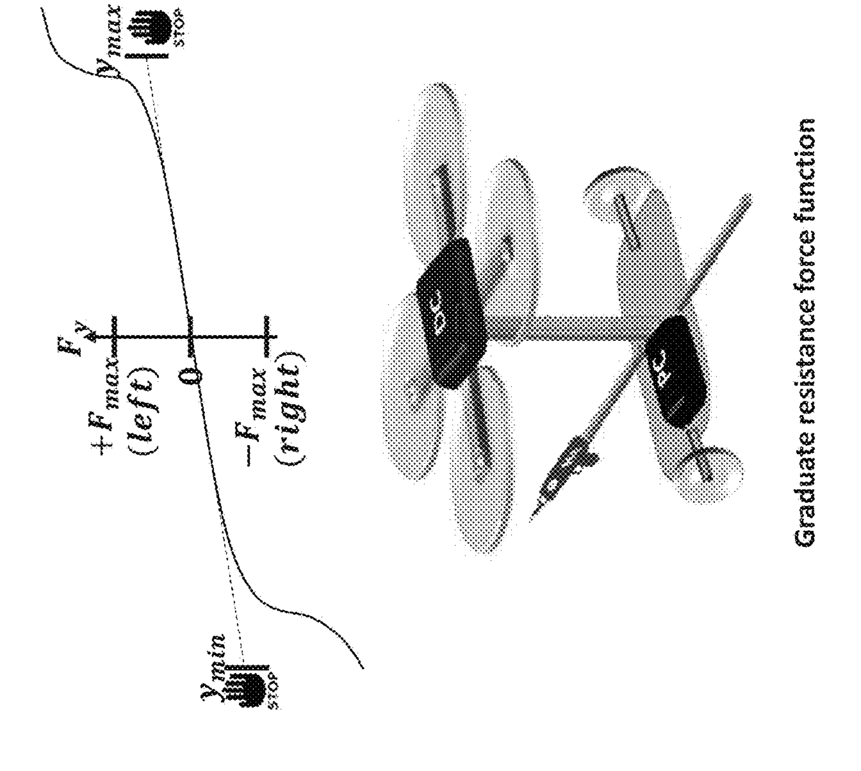

According to some embodiments of the present disclosure, the boundaries of the horizontal position may be limited by the drone controller using a step response of resistance force exerting or, alternatively, by gradual activation of a resistance force that becomes stronger as the active-payload pushes the drone closer to the boundary. FIGS. 7A and 7B schematically show examples of the control-type of 5½DOF(X,H,Pitch,Roll,Yaw), which shows a sharp and graduate resisting force exerting to prevent boundaries crossing, according to some embodiments of the present disclosure. In FIG. 7A the resistance is with graduate resisting force functions to boundary crossing and in FIG. 7B the resistance is sharp with a step response resistance force function to boundary crossing.

According to some other embodiments of the present disclosure, the drone controller 103 instructs the drone 101 to exert a continuous resisting or amplifying force function that depends on the first, second and third derivatives of a state vector of the drone. In this case, the drone 101 may simulate a virtual environment for the active-payload 104, such as virtual drag or operating in virtual reduced gravity or having an amplified force.

In some embodiments of the present disclosure, the drone controller 103 reacts to the active-payload force exerting in order to improve the payload controller 105 controllability on the released DOFs. For example, drone controller 101 may instruct drone 101 to exert a virtual drag that resists the movements of the drone along the released DOFs with a force that is a function of the velocity of the drone 101. This enables the payload controller 105 to achieve a softer velocity buildup and more precise control over the released DOFs. For example, the drone controller forth function can be of the form $f_x=-d\cdot v_x^2$ where d is the virtual drag coefficient, $f_x$ is the resistance forth that the drone controller employs over x direction and $v_x$ is the velocity of the drone in the x direction.

The drone controller 103 may control the DOFs and the velocity of the released DOF controlled by the payload controller. For example, the drone controller 103 may control the position of the drone over 4DOF(H, Pitch, Roll, Yaw) and in addition the drone controller 103 controls the velocity of the other released 2DOF($v_x$,$v_y$). The control over the velocity may be with sharp speed limits or by exerting a virtual drag by gradually increasing the resistance force in accordance with a monotonic increasing function of the velocity of the drone 101. This control-type may be denoted as 4DOF(H,Pitch,Roll,Yaw)@2DOF($v_x$,$v_y$).

Figure 8:
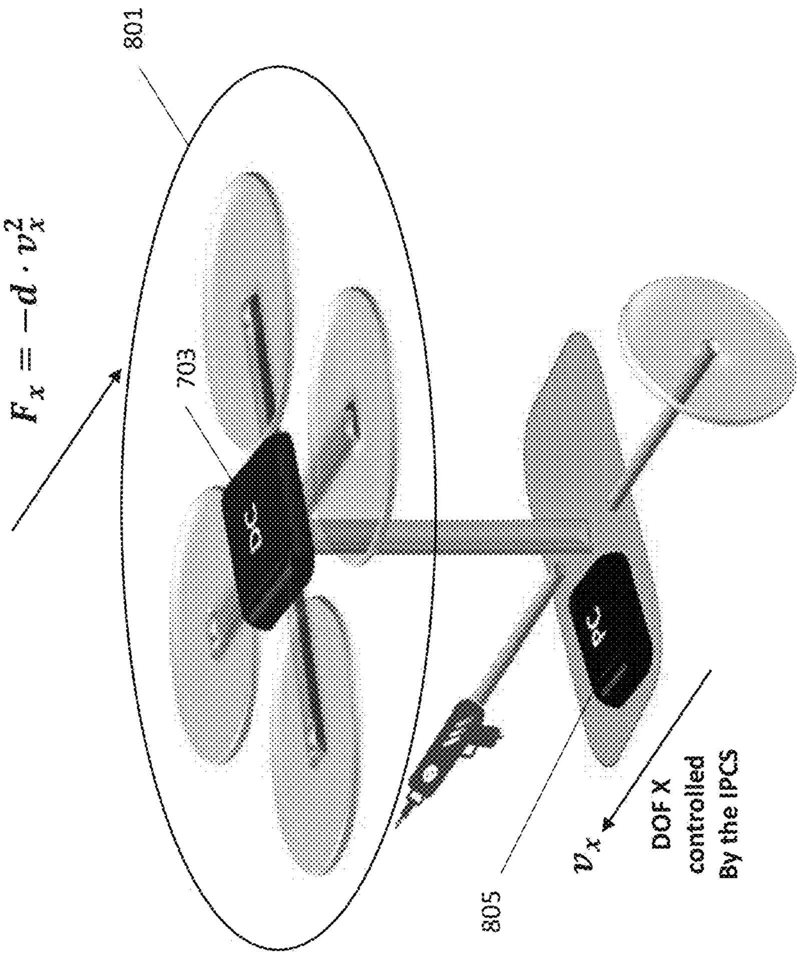
FIG. 8 schematically shows a drone that exerts a virtual drag over a released x-axis DOF, according to some embodiments of the present disclosure.

FIG. 8 schematically describes a drone 801 that exerts a virtual drag over a released X-axis DOF. Drone controller 803, controls the drone 801 to resist the movements of the drone 801 along X-axis DOF to exert virtual drag on the velocity that the payload controller 805 builds. The force along the X-axis is $f_x=-d\cdot v_x^2$, where d is the virtual drag coefficient.

According to some embodiments of the present disclosure, further to the definition of the released DOFs, values of physical parameters defining the control rules and thresholds of use for each released DOF are defined by the drone operator 103. The values of physical parameters defining the thresholds for each released DOF are maximal and/or minimal values.

In addition, according to some embodiments of the present disclosure, a final set of docking points of the active-payload are defined when implementing the drone. Typically, a plurality of docking points are defined to be able to couple the active-payload to the drone in various combinations in order to adapt the active-payload to the necessary task that is performed by the drone and active-payload. When the active-payload is coupled to the drone, it is coupled to one or more docking points selected from the final set of docking points defined. According to some embodiments of the present disclosure, the active-payload is temporarily and detachably coupled to the drone for performing one or more planned tasks and it may be decoupled from the drone and replaced with another different active-payload to perform one or more different tasks, which requires a different active-payload and tools. According to some embodiments of the present disclosure, the control type may be updated during the drone flight, for a further use of the current active-payload temporarily and detachably coupled to the drone. Thereby, the DOF controlled by the drone controller and the released DOF controlled by the payload controller are updated. Examples of a further use of the active-payload may be for performing one or more different tasks with the same active-payload or performing the same one or more tasks at a different location with different flight conditions. In case of updating the control-type, the maneuver instructions provided by the drone controller and the payload controller may also be updated, accordingly.

According to some embodiments of the present disclosure, the drone controller and the payload controller select maneuver instructions from a list of maneuver instructions. The maneuver instructions may be selected manually by a remote controlling the drone, operated by the drone operator. Alternatively, the maneuver instructions may be selected automatically by a data communication interface optionally installed between the drone controller and the payload controller.

According to some embodiments of the present disclosure, in order to function correctly, the coordinates system of the drone and the active-payload coupled to the drone should be parallel. The coordinates of the active-payload are aligned with the drone coordinates, for example, by several cycles of calibration flight pattern or by a stationary hovering. According to some embodiments of the present disclosure, a calibration flight may be performed with a predefined route selected from a list of routes. The list of calibration routes is a list of optional coordinate calibration flight patterns with their periodic route description and the number of calibration routes in every calibrating process.

Four options to achieve coordinates matching for X-axis (Forwards), Y-axis (Right) and Height (Up) are briefly presented in Table 1, at FIG. 9. The first method may be implemented with or without shaft-encoders on active-payload pivots. In this case there is no need for calibrating flight patterns. Implementation without shaft encoders may require limiters with relative narrow free sector on the pivots. The second option is to calibrate the X-axis and Y-axis with a calibrated wedge in a "quick release" connection to the drone, where the active-payload is easily coupled to the drone with standard connectors known in the art. H-axis is calibrated with inertial earth level. In this option, the calibration may be accomplished with a few seconds of hovering. A third option is to calibrate the active-payload coordinates according to the drone coordinates with predefine short flight pattern. A fourth option is for a case where there are two-separated INS installation in the drone and in the active-payload. In this case the X-axis is geodetic, the Y-axis is geodetic east and the H-axis is coordinated the Nadir. Recalibrating in this case may be accomplished with predefined short flight pattern or by GPS northing.

FIG. 10 with Table 2 schematically shows three options for orientation coordinates matching between the drone and the active-payload coupled to the drone, according to some embodiments of the present disclosure. The first option is to use a shaft-encoder relative to a wedge and active-payload connection base. This configuration enables a tight control of the active-payload manipulators in traditional control methods. The second option is to use for the Pitch and Roll—an IMU unit or a Tilt sensor installed in the drone and/or active-payload for inertial earth level calibration and use a gyro measuring relative to zero setup for the Yaw. This configuration enables a very loosely coupled distributed control over the drone and the active-payload, according to some embodiments of the present disclosure. Recalibrating in this case, may be accomplished with short hovering or other predefined flight pattern. A third option is a full IMU or INS system for all three Pitch, Roll and Yaw. This configuration enables a very loosely coupled distributed control over the drone and the active-payload, according to some embodiments of the present disclosure. Recalibrating may be accomplished with short hovering or other predefined flight pattern. According to some embodiments of the present disclosure, calibration may also include automatically estimating the weight of the active-payload by the drone controller.

Figure 11B:
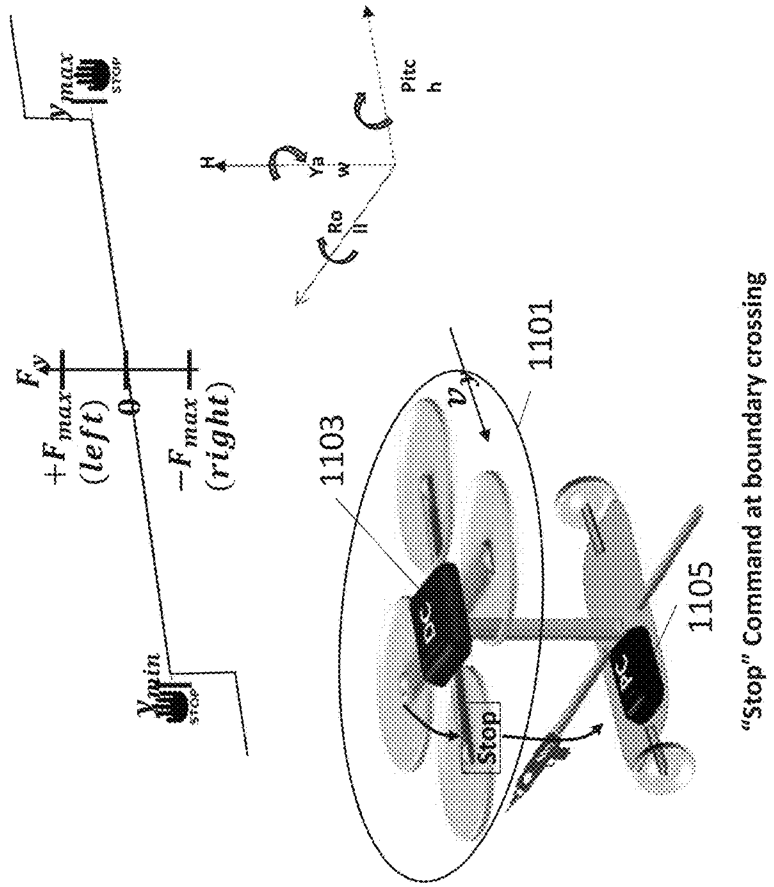
FIG. 11A-11B schematically illustrates the control-type of 5½DOF(X,H,Pitch,Roll,Yaw), with two optional advanced massages from the drone controller to the payload controller prior to the boundary crossing, according to some embodiments of the present disclosure.
Figure 11A:
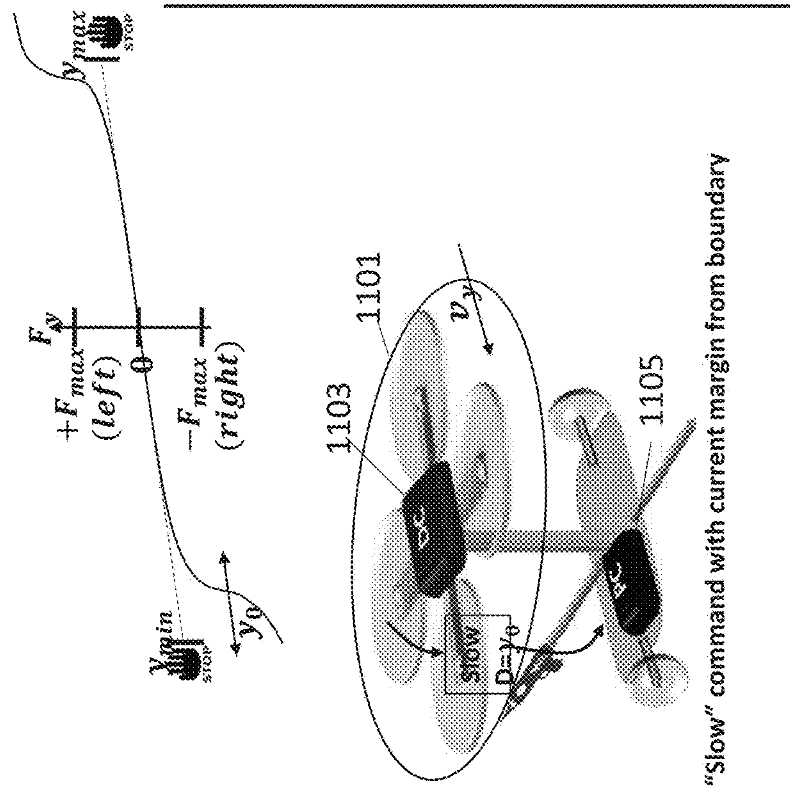

In some embodiments of the present disclosure, a communication protocol and a communication interface may be defined between the drone controller and the payload controller. In some embodiments of the present disclosure, the distributed control of the loosely coupled drone controller and payload controller, may have a very simple and thin interface between the drone controller and the payload controller. The physical layer may be any wired or wireless communication standard. The main massages in the logical layer of the interface includes massages from the drone controller to the payload controller and from payload controller to drone controller. The massages from the drone controller to the payload controller includes the selected control-type. The structure of the control-type massage includes all the involved parameters and functions that are required to define the exact control-type selected by the drone controller. Also, massages about the drone are sent from the drone controller to the payload controller. These massages includes general limitations of allowed forces, imbalances, and loads that any active-payload of the specific model of the carrying drone shall not violate. In addition, the control-types list of control types available for the drone and the specific type of active-payload coupled to the drone is sent from the drone controller to the payload controller. This list of control-types includes the control-types that may be selected by the drone controller in the current drone and for the current one or more planned tasks. The list includes default values, functions, and parameters of each control-type. Other massages sent from the drone controller to the payload controller includes stop or slow-down commands, attached to a relevant released DOF of the released DOFs that are controlled by the payload controller. According to some embodiments of the present disclosure, boundaries crossing may be prevented by the drone controller providing a notice to the payload controller via the communication interface. The drone controller may send a "stop" or "slow" commands to the payload controller when the payload controller pushes the drone out of the boundaries or close to the boundaries. The distance between the drone and the boundary may be attached to the notice sent from the drone controller to the payload controller. FIGS. 11A-11B schematically illustrate the control-type of 5½DOF(X,H,Pitch, Roll,Yaw) of the drone controller with two optional advanced massages from the drone controller to the payload controller prior to the boundary crossing, according to some embodiments of the present disclosure. FIG. 11 A schematically shows a drone 1101 which is approaching the boundary of $y_{max}$, and the drone controller 1103 sends a "slow" message to the payload controller 1105, with the distance d=y0, between the drone 1101 and the boundary of $y_{max}$. FIG. 11 B schematically shows a drone 1101, which crosses boundary ymin, and a stop message is sent from the drone controller 1103 to the payload controller 1105, to stop the boundary crossing.

In some embodiments of the present disclosure, other types of massages may be a released DOFs boundaries and limits massages. The boundaries and limits may be fixed or instantaneous. The boundaries and limits may also be in absolute coordinates or relative boundaries in active-payload coordinates. In some embodiments of the present disclosure, an in or out of boundaries flag massage may be sent from the drone controller to the payload controller. When "out of boundaries" flag is "on", the drone controller controls all DOFs and the payload controller does not exerts forth to resist the drone controller control over the drone with its active-payload thrusters. In some embodiments of the present disclosure, a list of calibrations routes is also sent from the drone controller to the payload controller.

Figure 12:
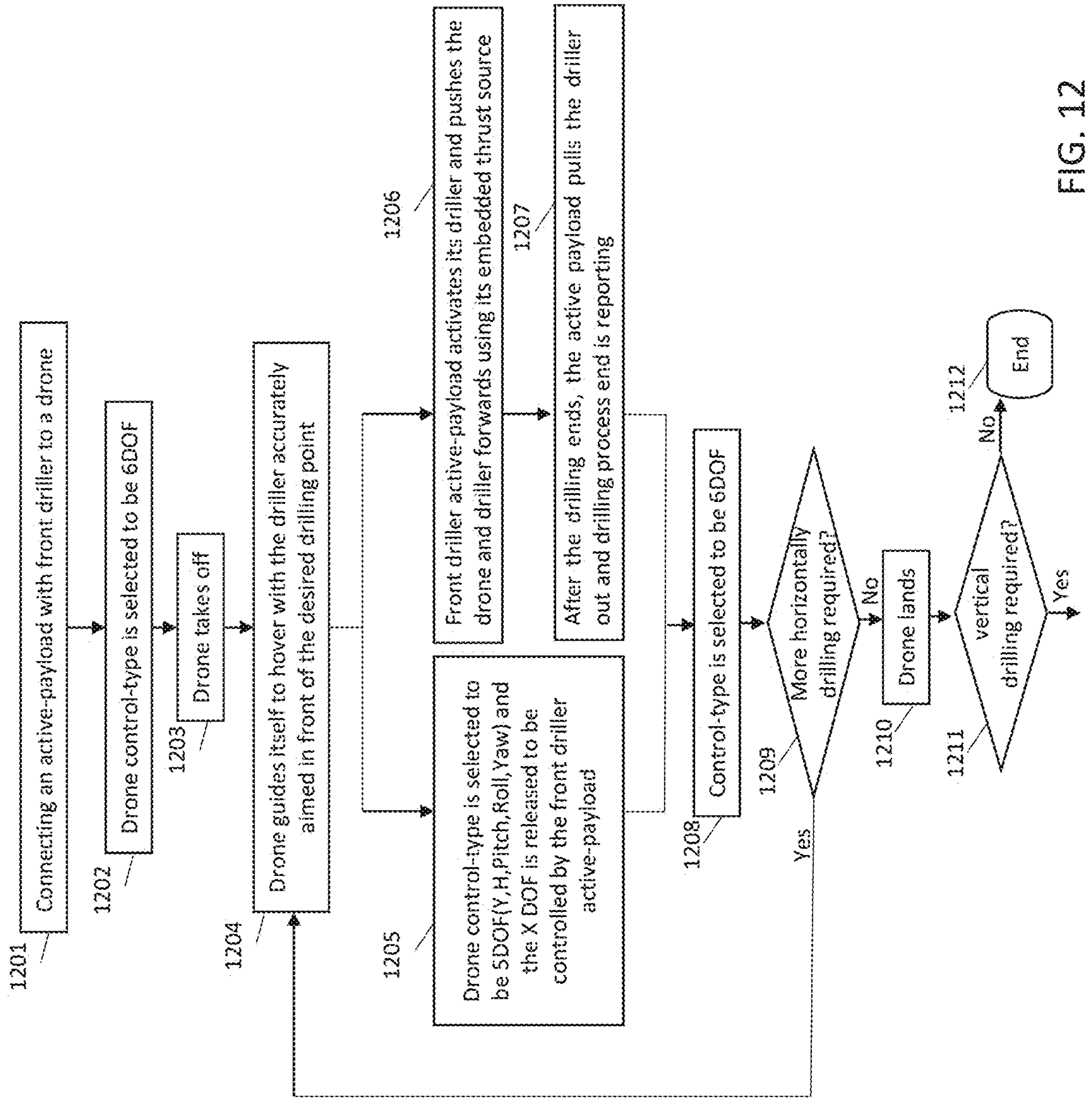
FIG. 12 schematically shows a flowchart describing an example of a possible use case of a drone carrying an active-payload, with distributed control over the drone controller and the payload controller and with a change of the active-payload and a change in the control-type, according to some embodiments of the present disclosure.

In some other embodiments of the present disclosure, massages from the payload controller to the drone controller may be sent. These massages includes active-payload identification massage that consist at least the total weight of the active-payload and optional additional parameters stating the released DOFs with the maximal thrust and/or imbalance that may be exerted in each of the released DOFs controlled by the payload controller. Also, position or orientation changing request may be sent from the payload controller to the drone controller. These massages requests for new setting for the values of the drones position in the DOFs that are controlled by the drone controller. For examples, setting new drones height in 4DOF(H,Pitch,Roll,Yaw) control-type, or changing the virtual drag coefficient in the control-type of 4DOF(H,Pitch,Roll,Yaw)@2DOF($v_x$,$v_y$). According to some embodiments of the present disclosure, request for control-type changing may also be sent from the payload controller to the drone controller. The payload controller is able to request the drone controller to change between predefined control-types taken from a finite list of control-types. Every request for control-type changing includes the required parameters setting. Each allowed control-type have a predefine default values for all its parameters. Only after the drone controller acknowledge the changing to the new control-type, the payload controller changes the control algorithms accordingly. FIG. 12 schematically shows a flowchart describing an example of a possible use case of a drone carrying an active-payload, with distributed control over the drone controller and the payload controller and with a change of the active-payload and a change in the control-type, according to some embodiments of the present disclosure. At 1201, an active-payload with a front driller installed in the active-payload is coupled to a drone. The drone controller identifies the active-payload type by receiving an input from the drone operator. At 1202, the control-type is selected by the drone controller to be a 6DOF, which means the drone controller controls all the DOFs of the drone and there is no released DOF to be controlled by the payload controller. At 1203, the drone takes off with the front driller active-payload coupled to the drone, and at 1204 the drone controller provides maneuver instructions to the drone to be able to hover with the front driller installed in the active-payload accurately aimed in front of the desired drilling point. At 1205, the drone control-type is changed to 5DOF (Y,H,Pitch,Roll,Yaw) and the X-axis DOF is released to be controlled by the front driller active-payload. From this stage, the drone controller preserve its position along Y-axis, its height, its orientation pitch a roll, and its Yaw direction. The position of the drone along X-axis is released to the control of the active-payload. Simultaneously and asynchronously, at 1206, the payload controller of the front driller active-payload activates the front driller and provides maneuver instructions so that the active payload pushes the drone and the front driller forwards using the thrust source installed in the active-payload. At 1207, after the drilling ends, the payload controller instruct the active-payload to pull the driller out and the drilling process end is reported to the drone controller. At 1208, the control-type is changed again to 6DOF by the drone controller, and at 1209, the drone controller checks if more horizontally drilling is required. In case more horizontally drilling is required then go back to 1204. Otherwise, in case horizontally drilling is not required then at 1210 the drone controller instruct the drone to land and at 1211 the drone controller checks if vertical drilling is required. In case vertical drilling is not required, at 1212 the tasks ends. Otherwise, if vertical drilling is required, at 1213 a front driller active-payload is replaced with the vertical driller active-payload and is coupled to the drone. The drone controller identifies the active-payload type, automatically by receiving an identification message from the payload controller of the active-payload, and at 1214 the control-type is selected to be 6DOF, by the drone controller. At 1215, the drone controller instruct the drone to take off, and the drone takes off. At 1216, the drone controller provides maneuver instructions to the drone to hover with the vertical driller installed in the active-payload accurately aimed above the desired drilling point. And at 1217, the control-type is selected by the drone controller to be 5DOF(X,Y,H,Pitch,Roll) and the Yaw DOF is released to be controlled by the vertical driller active-payload. From this stage, the drone controller preserve its position along X-axis and Y-axis, its height, its orientation pitch and roll. The direction Yaw is released to the control of the active-payload. Simultaneously and asynchronously, at 1218, the payload controller of the vertical driller active-payload activates the vertical driller and provides instructions to use the thrust sources installed in the vertical driller active-payload to maintain a fixed Yaw direction. At 1219, while the driller touches the ground, the control-type is selected to be 2½DOF(Pitch,Roll) to release both the drone and payload weight to press the working driller, while the drone controller controls only Pitch and Roll to preserve the verticality of the driller. In this case, there is no need for controlling the position of the drone along X-axis and Y-axis, as it is fixed to the ground during the drilling. At 1220, along the drilling, an altimeter installed in the drone is measuring the drilling depth and lifts the driller out while the drilling ends. At 1221, after the drilling ends, the active-payload pulls the driller out of the ground and drilling process end is reported to the drone controller, by the payload controller. At 1222, the control-type is selected to be 6DOF by the drone controller, and at 1223, the drone controller checks if more vertical drilling is required. In case, more vertical drilling is required go back to 1216, otherwise, at 1224, in case more vertical drilling is not required the task ends.

According to some embodiments of the present disclosure, another massage that may be sent from the payload controller to the drone controller is a request for drone pulling or pushing. This massage allows an active-payload operator to use a much stronger force exerting capability, by using the force of the carrying drone in addition to the force of the active-payload.

Figure 13:
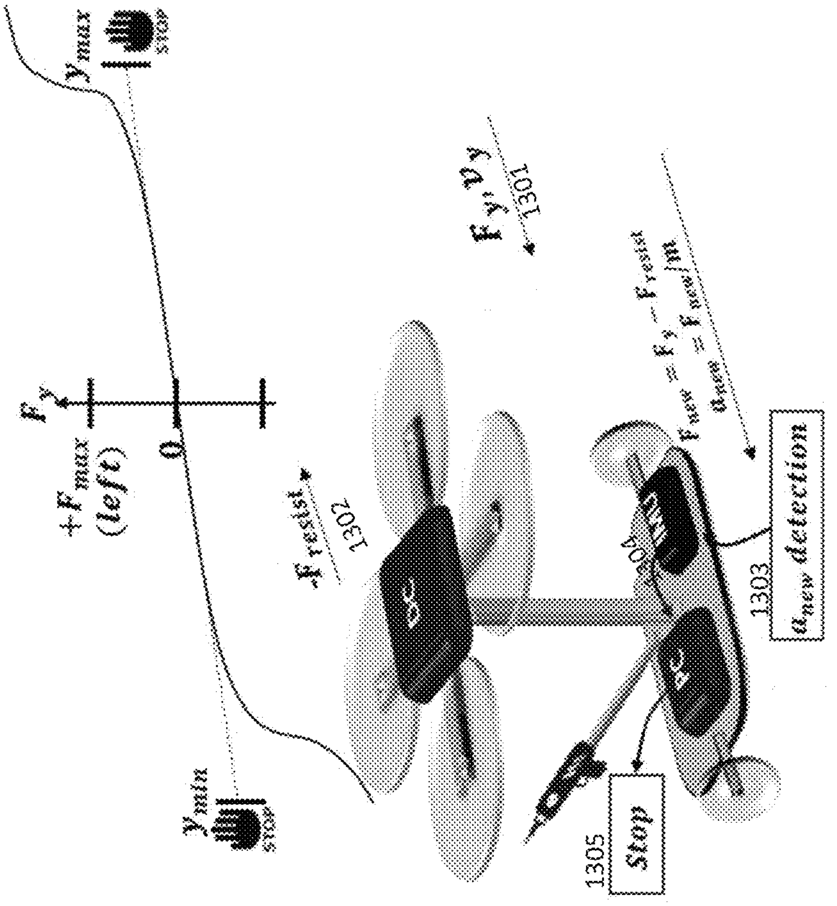
FIG. 13 schematically shows a possible implementation of a drone and an active-payload carried by the drone, with loosely distributed control over the drone and the active-payload, between the drone controller and the payload controller, without a direct interface communication between the drone controller and the payload controller, according to some embodiments of the present disclosure.

According to some other embodiments of the present disclosure, there is no communication between the drone controller and the active-payload coupled to the drone. When there is no communication between the drone and the active-payload, the payload controller recognizes maneuvers of the drone by inertial sensors of the active-payload, so the payload controller instructs to perform maneuvers using the thrust source or moving weight in response to the recognized maneuvers of the drone, accordingly. In addition, the drone controller also recognizes maneuvers of the active-payload by inertial sensors of the drone and performs maneuvers in response to the recognized maneuvers accordingly. In this case, the coupling between the drone and its active-payload is loosed enough to allow the entire interface to be non-mandatory. An additional and separate Inertial Measurement Unit (IMU) or Inertial Navigation System (INS) or other sensors, such as or a tilt-sensor or 3D magnetometer, or GPS northing system or any accurate relative navigation system that are integrated in the payload controller, enables to replace the need for communication between the drone controller and the payload controller. For example, according to some embodiments of the present disclosure, when there are two independent IMUs, one in the drone controller and one in the payload controller, the drone and the active-payload may communicate by using "inertial Gestures". For example, assuming a control-type of 5½DOF (H,Y,Pitch,Roll,Yaw) with boundary limits on the X-axis DOF. When the payload controller instructs to exert force to push the drone along the X direction, the active-payload stops pushing when the IMU of the payload detects a drone resistance. Another example may be assuming the control-type is 5DOF(H,Y,Pitch,Roll,Yaw)@ 1DOF($v_x$), with resistance forth function $f x=-d\ v_x$ for $v_x>v_0$ and $d<0$. When the payload controller pushes the drone along the X direction, the IMU in the drone controller detects it, and the negative d causes the drone controller to accelerate the drone further, as long as the drone is not crossing certain boundaries. According to some embodiments of the present disclosure, the only important thing that the payload controller should know in order to function correctly without direct and/or continuous communication with the drone controller, is the control-type. Because this parameter only changes from time to time along the task executed by the drone and active-payload, this information may be transferred to the payload controller by voice communication between the drone and the payload operators. Another option is that the drone controller and the payload controller are connected each to a ground station which may be communicating via a communication interface, in this case, the control-type may be sent from the drone controller to the payload controller via communication between the two ground stations. In order to prevent the possibility of operating the drone with too heavy active-payload without the active-payload identification massage, the drone controller may estimate the active-payload weight at the beginning of the flight by measuring the power that the propellers of the drone requires for hovering. FIG. 13 schematically illustrates a possible implementation of a drone and an active-payload carried by the drone, with loosely distributed control over the drone controller and the payload controller, without a direct interface communication between the drone controller and the payload controller, according to some embodiments of the present disclosure. At 1301 the payload controller pushes the drone to the left at velocity $v_y$ and force $F_y$. At 1302, when the drone reaches the left boundary, the drone controller controls the drone to exert a resisting force. At 1303, the drone slows down as a result of the resisting force and at 1304, the IMU of the payload controller detects an acceleration created by the resisting force the drone exerted. As a result, at 1305, the payload controller instructs the active-payload thrusters to stop exerting to the left.

According to some other embodiments of the present disclosure, the controller of the drone controller and the payload controller includes two ground control stations, one operated by the operator of the drone and one operated by the operator of the active-payload. The two ground control stations may be connected through communication interface or to be operated separately with voice coordinating between the two operators. In some embodiments of the present disclosure, the loose coupling between the drone controller and the payload controller, enables the operator of the drone to operate the drone from a remote site. Optionally the drone may also be controlled autonomously by a Command and Control Operation System (C2 system) and only the active-payload is operated by an operator. It is also possible that the interface between the drone and the active-payload coupled to the drone is only between the two ground operation stations where it is easier to implement the interface, especially when this interface is note sensitive to delays in switching between the control types of the drone controller.

Figures 14A, 14B, 14C, 14D:
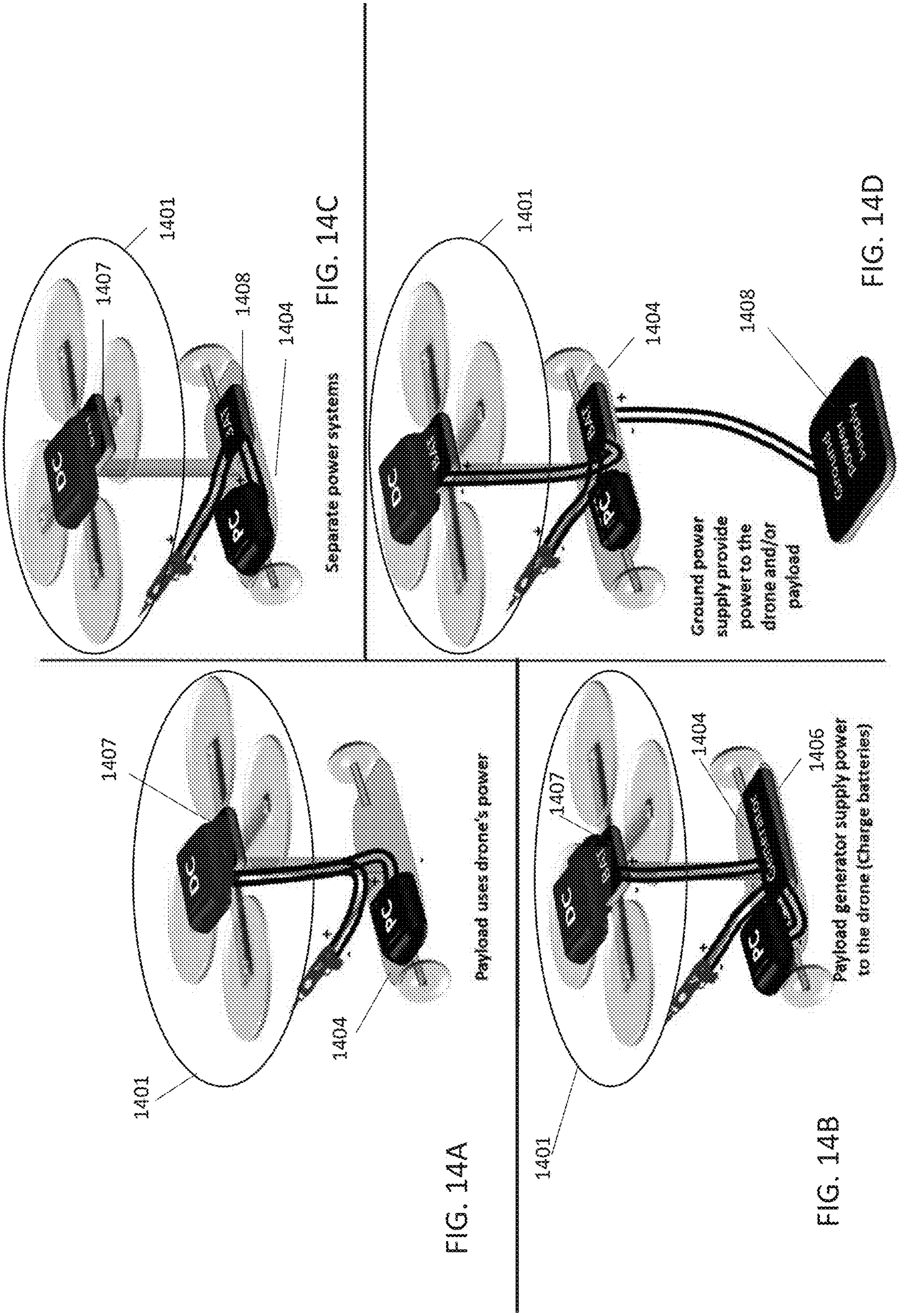
FIGS. 14A-14D schematically shows examples of different optional power source arrangements that enable to build a drone, according to some embodiments of the present disclosure.

According to some embodiments of the present disclosure, there is an electric connection between a drone power source and the active-payload. In this case, the active-payload may use the power source, such as batteries, of the drone to operate the tools installed in the active-payload. In some other embodiments of the present disclosure, a separate set of power sources may be deployed on the active-payload to operate its tools independently from the drone power source. Another option of power source arrangement is to wire the drone and/or the active-payload to an external power source located on the ground. FIGS. 14A to 14D schematically show examples of different optional power source arrangements that enable to build a drone, according to some embodiments of the present disclosure. In FIG. 14A active-payload 1404 uses battery 1407 of drone 1401. In FIG. 14B active-payload 1404 includes a generator 1406, which supplies power to the active-payload 1404 and to drone 1401 by charging battery 1407 of the drone 1401. In FIG. 14C the active-payload 1404 has a separated battery 1408 of its own, and in FIG. 14D a ground power supply 1409 provides power to the drone 1401 and/or active-payload 1404.

Reference is now made to the mechanical interface between the drone and the active-payload coupled to the drone.

In some embodiments of the present disclosure, the mechanical interface between the drone and the active-payload is typically connected by one to three gimbal pivots or by Kardani joint, to allow the payload controller to control some of its orientation DOFs (Pitch, Roll and Yaw) independently from the drone controller. This way the loosely coupled distributed control of the drone controller and the payload controller is supported, and it allows the payload controller to use the integral thrusters installed in the active-payload to perform the planned tasks independently. Typically, those pivots have limiters, where inside the limits, the payload controller is able to rotate the active-payload alone while enabling the drone controller to be free to change the orientation of the drone as required to keep the drone position steady. If the active-payload reaches one orientation limit and continues to push, it moves the drone with the active-payload, assuming this orientation DOF is released to the payload controller control. Else, the drone resists the rotating, for example by sending a "stop" command as described above.

Figure 15:
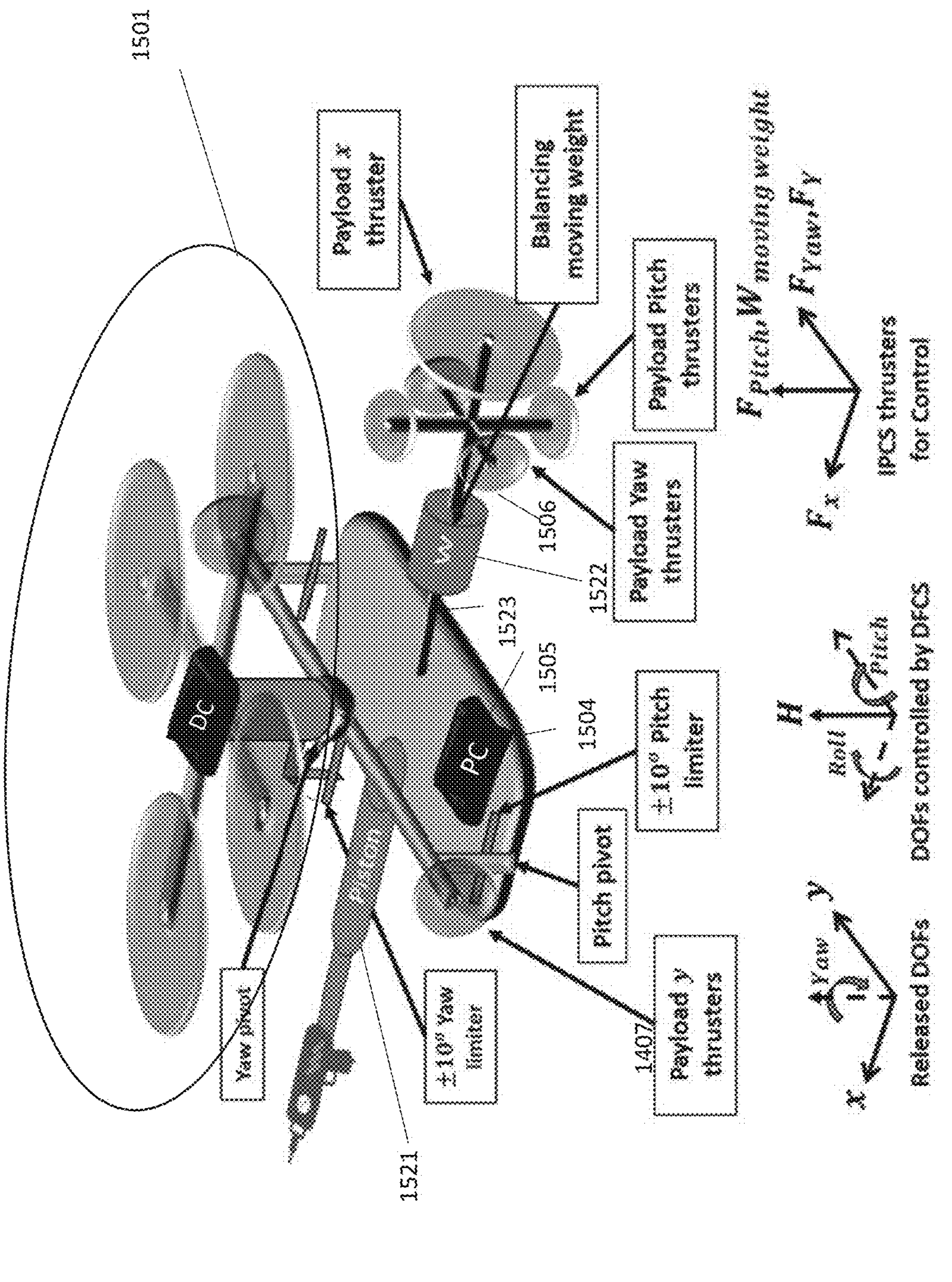
FIG. 15 schematically shows a use-case example for a control-type of 3.5DOF(H,Pitch,Roll), with multi tools payload connected by limiting Kardani Joint and controlled by four rear thrusters and balancing moving weight, and two side thrusters.

FIG. 15 schematically illustrates an example of a driller active-payload, according to some embodiments of the present disclosure. In this example, the control-type is 3½(H,Pitch,Roll) and the driller active-payload 1504 hangs beneath the drone 1501 above the center of gravity of the drone by two free gimbal pivots with ±100 limiters in Pitch and Yaw. The active-payload 1504 has a set of side controlling thrusts 1506 that may control the Pitch and Yaw DOFs of the active-payload and/or push the drone 1501 forwards along the X-axis DOF for drilling in walls. The active-payload has also side thrusters 1507 for the control of y-axis DOF. For fine tuning of Yaw inside the 200 free rotating sector of the Kardani joint, the payload controller 1505 may control the active-payload Yaw without rotating the drone. For bigger rotations of Yaw, the payload controller 1505 rotates the active-payload 1504 all the way to the limiter and continues pushing, to rotate the entire drone 1501 to the desired direction. In the Pitch DOF, the active-payload 1504 has free sector of 200 to level its driller direction independently from the unstable Pitch of the drone 1501. When the active-payload reaches the required drilling position and direction, the payload controller 1505 operates the driller of the active-payload and uses the active-payload rear thrusters to push the drone forward, while the drone controller 1503 is keeping the drone steady at the Height, Pitch and Roll DOFs. In order to keep the drone Height steady, the drone needs to be free to change its Roll and Pitch, and the Kardani joint allows it, without disturbing the drilling.

The pivots 1510 that connect active-payload 1504 to the drone 1501 may be free rotating or may be controlled by gimbals with servo system. According to some embodiments of the present disclosure, a standard and "quick release" connection may be built between drones and active-payloads (Such as a twist locks that connects containers to trucks). The "quick release" connection enables the drone to switch between different active-payloads of different manufacturers in a working site. According to some embodiments of the present disclosure, the active-payload balance may be kept in order not to violate the imbalance limitation of the drone. For example, as can be seen in FIG. 15, active-payload 1504 that operates a multi-purpose manipulating arm with a piston controlling the front arm length 1521 in the front, may use a moving weight 1522 on a rear rod 1523, to keep the active-payload center of gravity inside the active-payload imbalance limitations. Another example of possible mechanical arrangements may be a drone and an active-payload where the mechanical interface between the drone and the active-payload has a "Quick release" mechanism. The drone may or may not have a detector that signals the drone controller when there is an active-payload connected and alerts the drone controller when the "Quick release" mechanism is not completely fasten and secured.

Figure 16:
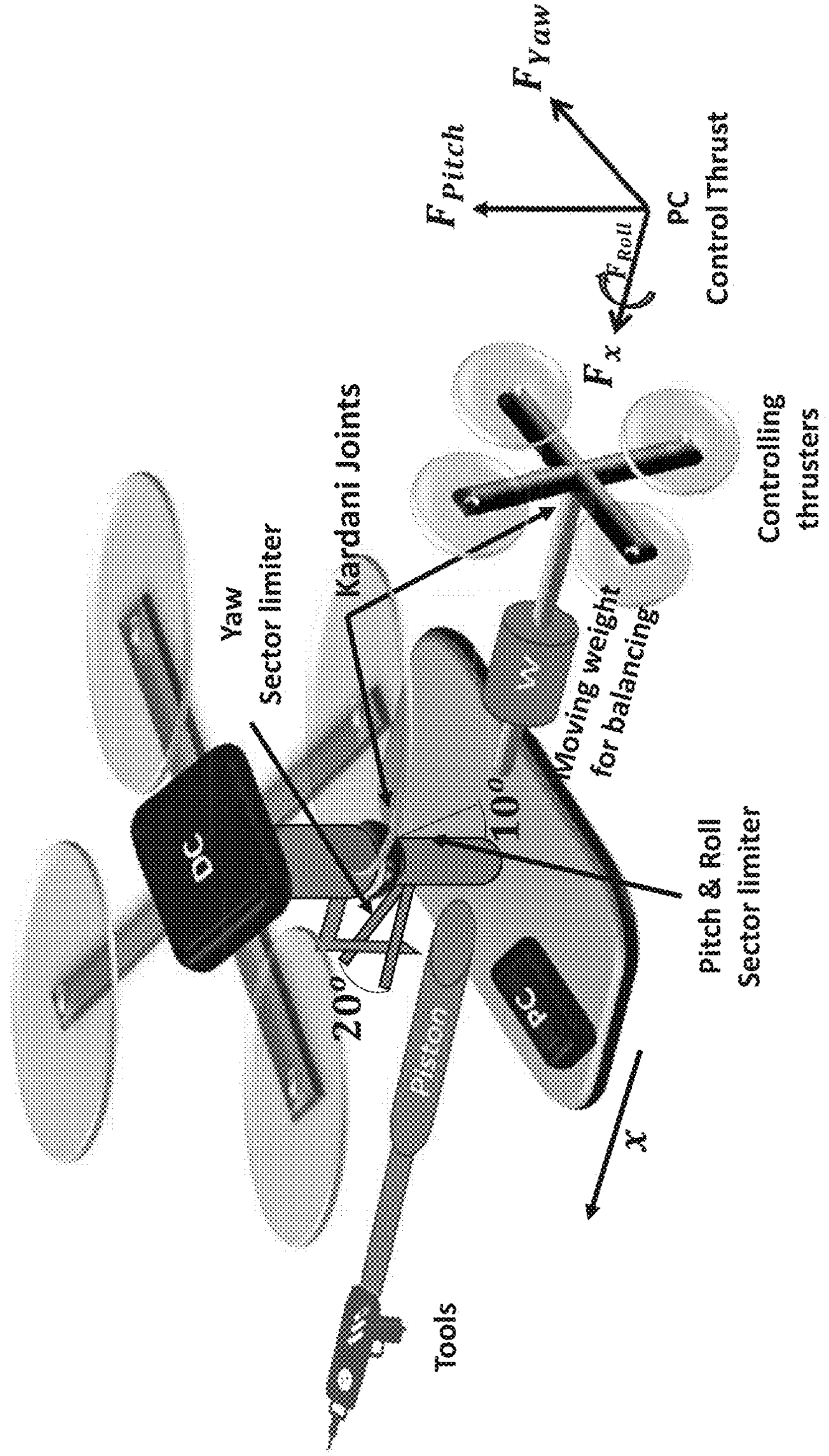
FIG. 16 schematically shows a use-case example for a control-type of 4.5DOF(Y,H,Pitch,Roll) with multi tools payload connected by limiting Kardani Joint and controlled by four rear thrusters and balancing moving weight, according to some embodiments of the present disclosure.

One more example may be of a drone and an active-payload where the mechanical interface between the drone and the active-payload is rigid. Alternatively, the mechanical interface between the drone and the active-payload may have one or two or three free rotating or servo controllable gimbal pivots, whereas each of the pivots may have sector limiters. Another possible configuration may be of a mechanical interface between the drone and the active-payload is built from Kardani joint that may have limited movement capability in Roll and Pitch DOFs and may have a sector limiter in Yaw DOF. FIG. 16 schematically shows a use-case example for a control-type of 4.5DOF(Y,H,Pitch, Roll) with multi tools payload connected by limiting Kardani Joint and controlled by four rear thrusters and balancing moving weight, according to some embodiments of the present disclosure.

According to some embodiments of the present disclosure, any kind of combination of the embodiments described above may be implemented.

According to some embodiments of the present disclosure, the permutation of the control-types are practically endless. Some examples of practical control-types are described herein. FIG. 18 schematically shows Table 3, which lists a partial set of possible examples of control types of the drone controller with some of their optional limits and force functions and with possible optional use-cases for each.

A control-type of 5DOF(Y,H,Pitch,Roll,Yaw), defines that the released DOF is X-axis, where the active-payload 104 may move the drone 101 only forwards and backwards. Optional use-cases may be for operating a task with a simple walls driller (as can be seen in FIGS. 4A-4B) or for using an active-payload with a contact detector. Another possible use-case is of an active-payload with limited pivots attached to its connecting base for Pitch or Roll or Yaw balancing of second plate, and with a front arm for multi tools operating, and with rear rod with balancing weight and rear set of thrusters attached to a second plate. This mechanical structure enables to stabilize, balance, aim and operate the multi tools front arm independently from the movements of the drone that are necessary for the stationarity and stability of the drone as can be seen for example in FIG. 15.

A control-type of 5½DOF(Y,H,Pitch,Roll,Yaw) defines the same as 5DOF(Y,H,Pitch,Roll,Yaw) with boundary protection function. Meaning that the released DOF is not fully controlled by the payload controller but rather it is also supervised by the drone controller to prevent boundaries crossing. Optional functions of the resisting force that may be exerted for operating the boundaries protection may be $$F_{resist} = \mp F_{max} \cdot [\text{step}\,(x - x_{max}) + \text{step}\,(x - x_{min})]$$

$$\left.\begin{aligned} &F\text{resist} = \mp F\text{max}\frac{F\text{max}}{(|x - x\text{min or max}) + 1)|}\text{ for }|x - x\text{min or }x\text{max}| < \\ &\qquad x0 \text{ and } x\text{min} < x < x\text{max}; \\ &F\text{resist} = \pm F\text{max for } x < x\text{min or } x\text{max} < x;\text{ else } F\text{resist} = 0 \end{aligned}\right\}$$

Where $F_{resist}$ is the resisting force exerted by the drone, $F_{max}$ is the maximal force that may be exerted, step (x) is a step function and $x_{min}$ and $x_{max}$ are the boundaries set on the X-axis.

A control-type of 5DOF(X,H,Pitch,Roll,Yaw) and a control-type of 5½DOF(X,H,Pitch,Roll,Yaw) define that the released DOF is Y-axis similar to 5DOF(Y,H,Pitch,Roll, Yaw) and 5½DOF(Y,H,Pitch,Roll,Yaw), with y replacing x. Optional use-cases for the Y-axis released DOF mat be horizontal sowing or drawing lines on walls.

Figure 17:
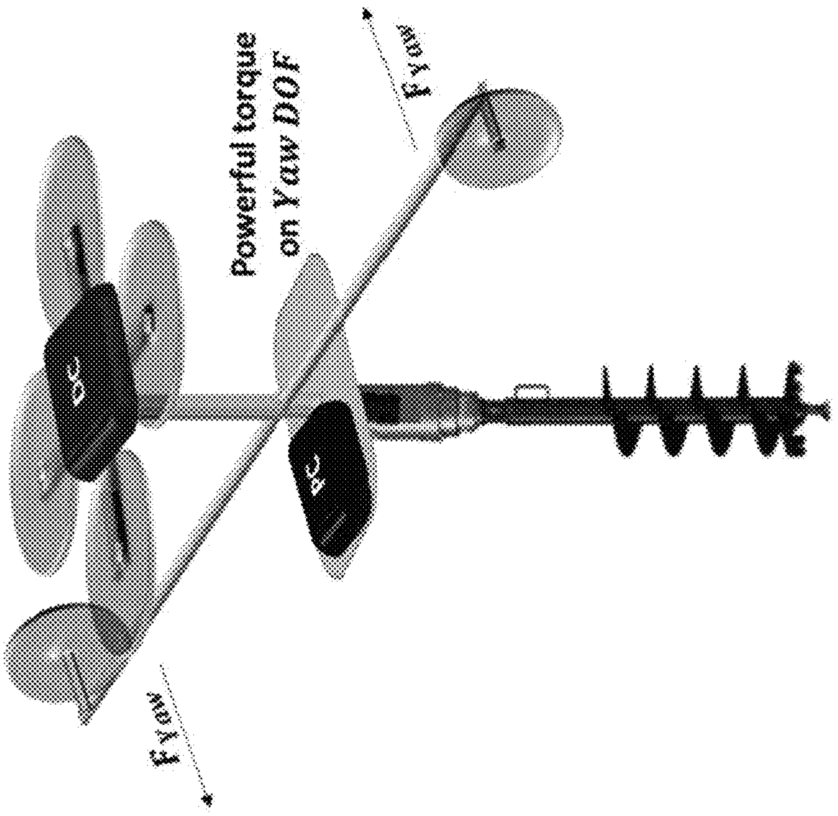
FIG. 17 schematically shows an example of a control-type of 5DOF(X,Y,H,Pitch,Roll), with optional use-case of a ground driller.

A control-type of 5DOF(X,Y,H,Pitch,Roll) define that the released DOF is the drone rotation, Yaw. Optional use-case may be for example, for vertical drilling that requires a bigger torque on Yaw DOF than the torque that a regular heavy drone can provide, as can be seen in FIG. 17, which schematically illustrates an example of vertical drilling, according to some embodiments of the present disclosure.

A control-type of 4DOF(H,Pitch,Roll,Yaw) and a control-type of 4½DOF(H,Pitch,Roll,Yaw) define that the released DOFs are the X-axis and the Y-axis, i.e. the position of the drone on the horizontal plane, these control-types may be used for better accurate and flexible tasks performing, for example as shown in FIGS. 6A-6B and FIGS. 7A-7B. In some embodiments of the present disclosure, these control-types are similar to the control-types of 5DOF(Y,H,Pitch, Roll,Yaw) and 5½DOF(Y,H,Pitch,Roll,Yaw), with resisting and/or amplifying functions for x and y DOFs.

A control-type of 3½DOF(H,Pitch,Roll) defines that the released DOFs are X-axis, Y-axis and Yaw rotation-axis of the drone, as described above and in FIG. 15.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. It is expected that during the life of a patent maturing from this application many relevant methods and systems of loosely coupled distributed control over drone and payloads carried by the drone will be developed and the scope of the term methods and systems loosely coupled distributed control over drone and payloads carried by the drone is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A system, comprising:

a drone, which is an aircraft that is able to hover;

an active-payload carried by the drone, which comprises a self-embedded payload controller and at least one thrust source and/or moving weight;

a drone controller coupled to the payload controller, the drone controller identifies a current active payload that is temporarily and detachably coupled to the drone, and selects a control from a predefined list of controls; wherein each of the controls define degrees of freedom (DOFs) to be controlled by the drone controller and released DOFs to be controlled by the payload controller, according to the identified current active-payload and according to one or more task characteristics planned to be performed by the drone and the current active-payload, wherein the selected control defines an allocation of each degree of freedom to either the drone controller or the payload controller, and wherein the drone controller assigns and reassigns the released DOFs based on the identified payload type and task; and wherein when performing the one or more tasks with the drone and the current active-payload temporarily and detachably coupled to the drone, the drone controller controls maneuver instructions in drone controlled DOFs and the payload controller controls maneuver instructions in the released DOFs by exerting controllable force or torque in the released DOFs with the at least one thrust source and/or moving weight.

2. The system of claim 1, wherein for each control, the drone controller sets predefined or changeable values of physical parameters defining the control rules and thresholds of use for each drone controller controlled DOFs and for each of the released DOFs.

3. The system of claim 1, wherein the active-payload is temporarily and detachably coupled to one or more docking points selected from a final set of defined docking points.

4. The system of claim 1, wherein the drone controller aligns coordinates of the drone and the current active-payload by performing a calibration flight with a predefined route selected from a list of routes or by a stationary hovering, using inertial or rate sensors or direction-finding sensors that are installed on the drone and on the payload.

5. The system of claim 1, wherein the maneuver instructions are selected from a list of maneuver instructions.

6. The system of claim 1, wherein a communication protocol between the drone controller and the payload controller is defined;

wherein messages from the drone controller to the payload controller comprises at least one member of the following list:

the predefined list of controls;

forces, imbalances and loads for each one or more docking point that the current active-payload is not allowed to violate;

a predefined list of controls available for the drone and the current active-payload temporarily and detachably coupled to the drone;

values of physical parameters defining control rules and thresholds of use for each control;

values of physical parameters defining control rules and thresholds of use for each DOF and released DOF;

a list of calibration routes;

a stop or slow-down commands, attached to a relevant released DOF controlled by the payload controller;

boundaries and limits for the defined released DOFs controlled by the payload controller; and an in and/or out of boundaries flag message; and wherein messages from the payload controller to the drone controller comprises at least one member of the following list:

the current active-payload weight, center of gravity relative to one or more docking points of the current active-payload and DOFs available to be controlled by the payload controller;

parameters stating releasable DOFs with a maximal thrust and/or imbalance that is allowed to be exerted in each of the released DOFs controlled by the active-payload;

a position or orientation changing request message; and parameters setting of drone control rules and thresholds message.

7. The system of claim 6, wherein when an out of boundaries flag message is sent from the drone controller to the payload controller, the drone controller takes control over the released DOFs, so that the drone controller controls all six DOFs of the drone until the drone and the current active-payload are in an in-boundary area.

8. The system of claim 1, wherein the control is defined automatically by a data communication interface between the drone controller and the payload controller or manually, by a remote controlling the drone.

9. The system of claim 1, wherein the drone controller changes between different controls from the predefined list of control for performing different one or more tasks, by the drone and the current active-payload.

10. The system of claim 1, wherein:

maneuvers performed by the current active-payload temporarily and detachably coupled to the drone are recognized by the drone controller using inertial and rate sensors installed in the drone, and maneuvers are performed in response by the drone; and/or maneuvers made by the drone are recognized by the current active-payload temporarily and detachably coupled to the drone, by one or more inertial and rate sensors installed in the current active-payload temporarily and detachably coupled to the drone, and maneuvers are performed by the current active-payload in response.

11. The system of claim 1, wherein the selected control defines at least one of:

the payload controller controls the released DOFs independently from the drone controller and the released DOFs are controlled by the payload controller and are supervised by the drone controller.

12. The system of claim 11, wherein the drone controller takes control over the released DOFs to control maneuver instructions in the released DOF; wherein in a communication between the drone controller and the payload controller and the drone controller at least one of the following is performed:

a stop message to the payload controller is sent to stop controlling the released DOFs by the payload controller and to control the released DOFs by the drone controller; and a slow-down message attached to a relevant released DOF controlled by the payload controller.

13. The system of claim 1, wherein the drone is operated by an operator, that uses a remote-control station or by a remote autonomous Command and Control Operation System; and the current active-payload is operated by a second operator that uses a second control station or a remote.

14. The system of claim 1, further comprising a drone power source and a current active-payload power source, which are independent or which are electrically connected according to one of the following arrangements:

the current active-payload uses the drone power source to operate tools installed in the current active payload;

the current active payload power source supplies power to the drone; and the current active payload power source and the drone power source are electrically connected to an external ground power source.

15. The system of claim 1, wherein the drone and the current active-payload are connected by one to three gimbal pivots or by Kardani joint; wherein the pivots contain limiters which enable the payload controller to rotate the current active-payload alone inside limits created by the limiters, while the drone controller is able to change the drone orientation as required for keeping the drone position stable.

16. A drone, which is an aircraft that is able to hover, comprising:

a drone controller which identifies a current active-payload of an active-payload temporarily and detachably coupled to the drone, and selects a control from a predefined list of controls; wherein each of the controls defines degrees of freedom (DOFs) to be controlled by the drone controller and released DOFs to be controlled by a payload controller coupled to the drone controller, which is embedded in the active-payload, according to the identified current active-payload and according to one or more task characteristics planned to be performed by the drone and the current active-payload, wherein the selected control defines an allocation of each degree of freedom to either the drone controller or the payload controller, and wherein the drone controller assigns and reassigns the released DOFs based on the identified payload type and task; and wherein when the drone performs one or more tasks with the current active-payload temporarily and detachably coupled to the drone, the drone controller controls maneuver instructions maneuvering the drone and the payload controller controls maneuver instructions maneuvering the drone and the current active-payload.

17. The drone of claim 16, wherein the drone controller defines values of physical parameters defining control rules and thresholds of use for each released DOF and for every control.

18. An active-payload, temporarily and detachably coupled to a drone, the drone having a drone controller, comprising:

one or more thrust sources and/or moving weight; and a payload controller coupled to the drone controller, which receives released degrees of freedom (DOFs) from the drone controller to be controlled by the payload controller, wherein the received released degrees of freedom are selected by the drone controller control that defines an allocation of each degree of freedom to either the drone controller or the payload controller, and wherein the drone controller assigns and reassigns the released DOFs based on the identified payload type and task, and the payload controller instructs the active-payload to perform maneuvers along the released DOFs;

wherein when the drone performs one or more tasks with the active-payload temporarily and detachably coupled to the drone, the drone controller controls maneuver instructions maneuvering the drone, and the payload controller controls maneuver instructions maneuvering the drone and the active-payload by exerting controllable force or torque in the released DOFs with the one or more thrust sources and/or moving weight.

19. The active-payload of claim 18, further comprising one or more inertial and rate sensors installed in the active-payload, wherein the payload controller recognizes maneuvers performed by the drone by the one or more inertial and rate sensors and instructs the payload to perform maneuvers in response.

20. A method of using a controller for controlling a drone, provided a system, comprising:

hovering a drone aircraft;

carrying an active-payload by the drone, the active-payload comprises a self-embedded payload controller and at least one thrust source and/or moving weight;

identifying, by a drone controller coupled to the payload controller, a type of a current active payload temporarily and detachably coupled to the drone; and selecting, by the drone controller, a control from a predefined list of controls;

wherein each of the controls defines degrees of freedom (DOFs) to be controlled by the drone controller and released DOFs to be controlled by the payload controller, such that each degree of freedom is allocated by the drone controller to either the drone controller or the payload controller, according to the identified current active-payload and according to one or more task characteristics planned to be performed by the drone and the current active-payload; and wherein when performing the one or more tasks with the drone and the current active-payload temporarily and detachably coupled to the drone, the drone controller controls maneuver instructions in drone controlled DOFs and the payload controller controls maneuver instructions in the released DOFs by exerting controllable force or torque in the released DOFs with the at least one thrust source and/or moving weight.

* * * * *